United States Patent [19]
Wynn

[11] Patent Number: 5,859,419
[45] Date of Patent: Jan. 12, 1999

[54] PROGRAMMABLE MULTIPLE COMPANY CREDIT CARD SYSTEM

[75] Inventor: Sol H. Wynn, 11046 Grenache Way, Elk Grove, Calif. 95624

[73] Assignee: Sol H. Wynn, Elk Grove, Calif.

[21] Appl. No.: 535,712

[22] Filed: Sep. 28, 1995

[51] Int. Cl.[6] .................................................. G06K 19/00
[52] U.S. Cl. ....................... 235/487; 235/380; 235/493; 235/449
[58] Field of Search .................................. 235/380, 487, 235/492, 493, 449

[56] References Cited

U.S. PATENT DOCUMENTS

| | | | |
|---|---|---|---|
| 4,443,027 | 4/1984 | McNeely et al. | 235/492 X |
| 4,831,245 | 5/1989 | Ogasawara | 235/492 |
| 4,837,422 | 6/1989 | Dethloff et al. | 235/380 |
| 4,853,522 | 8/1989 | Ogasawara | 235/380 |
| 4,961,142 | 10/1990 | Elliott et al. | 235/380 X |
| 5,153,583 | 10/1992 | Murdoch | 340/825.54 |
| 5,485,154 | 1/1996 | Brooks et al. | 342/44 |

*Primary Examiner*—Donald T. Hajec
*Assistant Examiner*—Jeffrey R. Filipek

[57] ABSTRACT

A universal financial data card for compiling and storing financial transaction records pertaining to a plurality of financial accounts. The financial transaction records are compiled from financial transaction data communicated between the universal financial data card and a card reader. The universal financial data card includes a memory circuit for storing holder data pertaining to a holder of the universal financial data card. The memory circuit further stores account data pertaining to the plurality of financial accounts and the financial transaction records pertaining to the plurality of financial accounts. Further, the universal financial data card includes a processor coupled to the memory circuit. There is also provided a data exchange circuit coupled to the processor. The data exchange circuit permits the universal financial data card to receive first selected data from the card reader and to send second selected data to the card reader during a financial transaction pertaining a selected one of the plurality of financial accounts, wherein the processor, responsive to the first selected data, compiles a transaction record related to the financial transaction pertaining the selected one of the plurality of financial accounts for storage in the memory circuit.

7 Claims, 21 Drawing Sheets

PROGRAMMABLE MULTIPLE COMPANY CREDIT CARD SYSTEM

BACKGROUND OF THE INVENTION

The present invention relates generally to financial data systems. More particularly, the invention relates to methods and apparatus for a universal financial data system, part of which advantageously serves as a highly portable cash substitute that is also capable of electronically compiling, storing, and retrieving data related to multitudes of financial accounts and transactions in real time as the transactions occur.

In the prior art, there exists known financial data storage methods and apparatus that enable them to serve as cash substitutes. One example involves the familiar credit card, known by their various tradenames as Visa™ cards, MasterCard™ cards, and the like. On these prior art credit card, however, the amount and types of data stored are typically quite limited. For example, none of the prior art credit cards are capable of storing transactional data, i.e., data related to transactions involving the account associated with that card. Examples of such transactional data include the amounts of money spent on certain goods or services, the names of the establishment where such transaction takes place, the date and time of such expenditures, and the like. Further, each of these prior art cards is typically associated with a single account or a single financial institution. Because of this, it is necessary to carry multiple cards if the use of multiple accounts, some of which may be of different types and issued by different institutions, is desired. Consequently, while these cards are useful as cash substitutes, they do not satisfactorily serve as apparatus for storing data pertaining to one's financial conditions and activities.

Financial data storage systems are also known. By way of example, there exists software accounting packages designed for execution on digital computers, such as Quicken™ by Intuit Corporation of Menlo Park, Calif., that are capable of managing data related to financial accounts and transactions. However, these prior financial data storage systems are not designed to operate as cash substitutes. For example, they are neither convenient to carry nor linked to financial institutions to allow their users to obtain goods and services.

Further, they do not, in an integrated manner, gather transactional data automatically as transactions occur to update their accounts. Their function is purely bookkeeping. If the accounts in these prior art financial data storage systems are to be updated, their users would have to manually enter the transaction data, perhaps from the transaction receipts. Because of the additional labor required to track data related to transactions, users are often discouraged from consistently using these products to manage their financial data.

In view of the above, what is desired is an improved method and apparatus for a universal financial data system and card that not only serves as a portable cash substitute but also has the intelligence to gather transaction data as transactions occur to update its accounts. To reduce the number of cards a user has to carry, the improved apparatus is preferably capable of storing financial and transaction data related to multiple accounts, some or all of which may be issued by different financial institutions. To further improve usability, it is preferable that the universal data card communicate with other devices using a wireless link.

SUMMARY OF THE INVENTION

The present invention relates to a smart universal financial data card which allows its holder to keep track of all his financial data and financial transaction data in a highly portable package. The inventive universal financial data card is capable of supporting multiple accounts of various types from diverse financial institutions. By way of example, different account types such as checking, savings, credit accounts, gasoline and department store accounts, securities accounts such as stocks or bonds, accounts related to medical insurance, government support programs such as social security, food stamps, government medical support, and the like, may all be kept track of by the inventive universal financial data card. All transactions related to the accounts stored in the universal financial data card are also kept track of thereon. If desired, the holder may also retrieve valuable information from the universal financial data card regarding these accounts such as date of transaction, amount spent, name of payee, type of transaction, service fees, interest charges, monthly or yearly statements for each account or all accounts, and monthly or yearly data for each account or all accounts in various data formats, including spreadsheet formats.

In one embodiment, the invention relates to a universal financial data card for compiling and storing financial transaction records pertaining to a plurality of financial accounts. In this embodiment, the financial transaction records are compiled from financial transaction data communicated between the universal financial data card and a card reader.

The universal financial data card includes a memory circuit for storing holder data pertaining to a holder of the universal financial data card. The memory circuit further stores account data pertaining to the plurality of financial accounts and the financial transaction records pertaining to the plurality of financial accounts.

Further, the universal financial data card includes a processor coupled to the memory circuit. There is also provided a data exchange circuit coupled to the processor. The data exchange circuit permits the universal financial data card to receive first selected data from the card reader and to send second selected data to the card reader during a financial transaction pertaining a selected one of the plurality of financial accounts, wherein the processor, responsive to the first selected data, compiles a transaction record related to the financial transaction pertaining the selected one of the plurality of financial accounts for storage in the memory circuit.

In another embodiment, the data exchange circuit of the universal financial data card facilitates wireless communication with the card reader.

In yet another embodiment, the invention relates to a method for compiling and storing financial transaction records pertaining to a plurality of financial accounts. The financial transaction records are compiled from financial transaction data communicated between the universal financial data card and a card reader.

The method includes the step of providing a memory circuit for storing holder data pertaining to a holder of the universal financial data card. The memory circuit further stores account data pertaining to the plurality of financial accounts and the financial transaction records pertaining to the plurality of financial accounts. Further, the invention includes the step of coupling a processor to the memory circuit. Additionally, there is provided the step of coupling a data exchange circuit to the processor. The data exchange circuit permits the universal financial data card to receive first selected data from the card reader and to send second selected data to the card reader during a financial transaction pertaining a selected one of the plurality of financial accounts, wherein the processor, responsive to the first selected data, compiles a transaction record related to the financial transaction pertaining the selected one of the plurality of financial accounts for storage in the memory circuit.

These and other advantages of the present invention will become apparent upon reading the following detailed descriptions and studying the various figures of the drawings.

BRIEF DESCRIPTION OF THE DRAWINGS

Additional advantages of the invention will become apparent upon reading the following detailed description and upon reference to the drawings, in which.

DETAILED DESCRIPTION OF THE PREFERRED EMBODIMENTS

Figure 1:
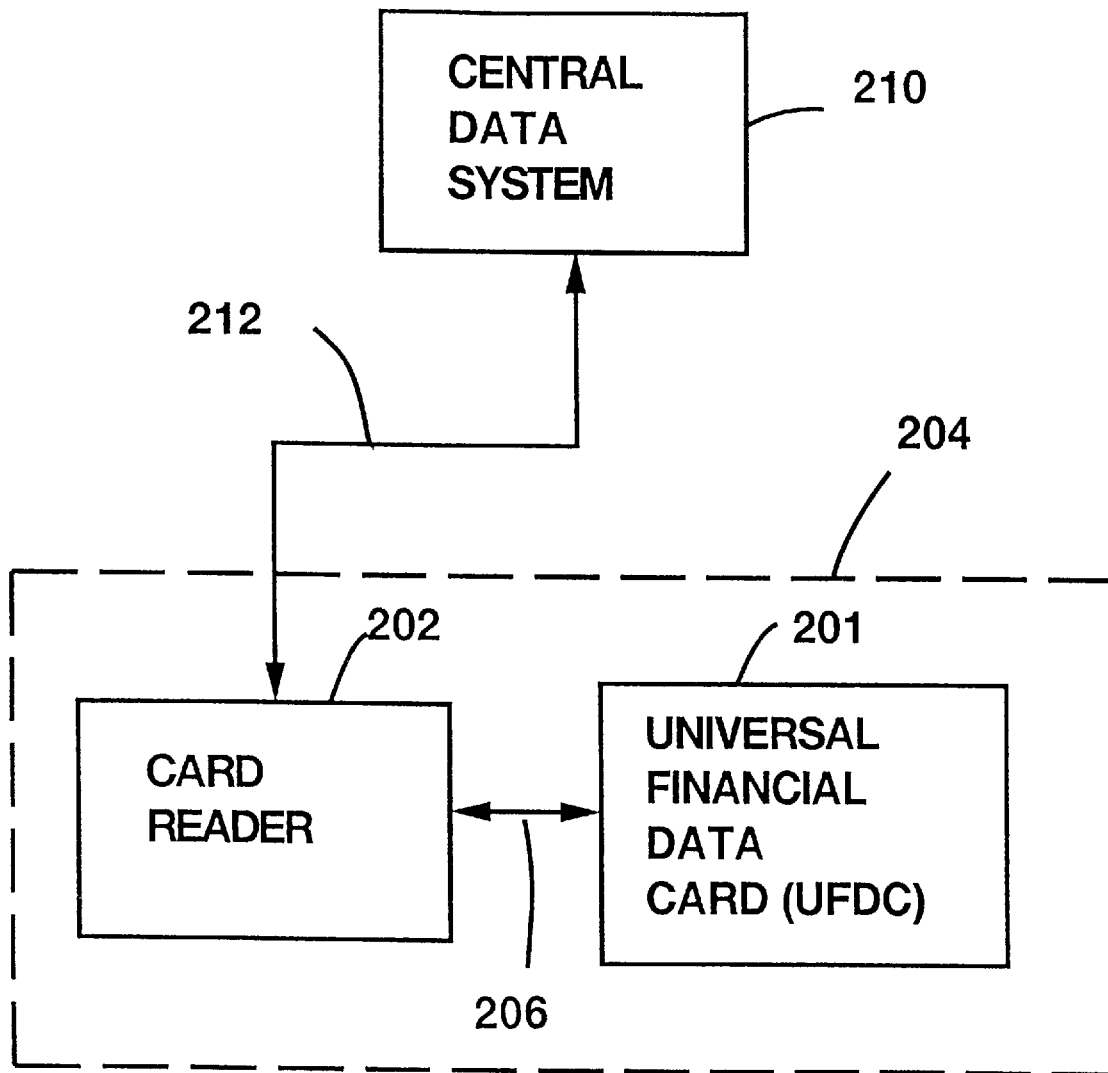
FIG. 1 shows in one embodiment the major components of the universal financial data system, including a card reader and a universal financial data card.

FIG. 1 shows in one embodiment the major components of the universal financial data system (UFDS) 204, which comprises a universal financial data card (UFDC) 201 and a card reader 202. Universal financial data card (UFDC) 201 is used for compiling and storing financial data pertaining to a plurality of financial accounts of the card holder. As will be discussed later, the financial data is preferably stored in the persistent memory space of universal financial data card (UFDC) 201. To manipulate the financial data stored therein, UFDC 201 also preferably includes circuitry for performing selected operations responsive to commands received from a card reader 202.

Card reader 202 facilitates communication between UFDC 201 and human users and/or other peripheral devices such as printers, computers, automatic teller machines (ATM), scanners, and the like. Presently, it is contemplated that card reader 202 may exist in three different embodiments: 1) a financial institution model for use by financial institutions such as banks, credit companies, brokerage companies, and other institutions that issue or manage financial accounts; 2) a commercial model suitable for use by commercial establishments that provide goods or services to the holder of UFDC 201; and 3) a residential model suitable for use in the home to perform operations such as retrieving account information, performing athome banking, automatic payment, printing checks, and the like.

In one embodiment, UFDC 201 preferably communicates with card reader 202 using a wireless/RF interface. To enhance security, the communication through the aforementioned wireless/RF interface is preferably encrypted using known encryption techniques. In other embodiments, however, UFDC 201 may communicate with card reader 202 via a magnetic interface (i.e., via an appropriate magnetic reader to pick up data stored magnetically), via an optical interface using infrared or laser energy for storing and retrieving data, or via direct data coupling through the physical connection of conductors.

In operation, UFDC 201 receives the financial data pertaining to the financial accounts of the card holder and stores them in the memory space of UFDC 201. In accordance with one particularly advantageous aspect of the present invention, multiple accounts having different types, e.g., checking accounts, savings accounts, credit card accounts, securities accounts, may all be stored in the same UFDC 201. The financial data pertaining to each account may include the information regarding the financial institution that issues a particular financial account, e.g., name, address, contact information, and the like. Further, the financial data may also include information regarding the account, e.g., account number, account password, account type, and the like. Additionally, the financial data also includes financial transaction records pertaining to the transactions that impact a particular account. Along with the financial transaction records, the balance (or credit limit if appropriate) is also kept track of for each account.

The ability of the inventive UFDC 201 to store, in an organized manner, financial transaction records related to multiple accounts from different financial institutions represents an advantage over prior art cards. The ability to manage accounts of different types and multiple accounts advantageously reduces the number of cards a user has to carry. This represents an improvement over the current situation in which the user has to carry one card for each financial account or each financial institution.

More importantly, these financial transaction records are automatically compiled and stored as UFDC 201 is being used to obtain goods and/or services, thereby obviating the need to independently enter data after the transaction occurs. This automatic data compilation and storage feature also eliminates the possibility of data tampering. Preferably, the financial transaction records stored in UFDC 201 cannot be manipulated by the holder of UFDC 201 independent of a transaction. In other words, the data in UFDC 201 is read-only as far as the user or the holder of UFDC 201 is concerned. Because the transaction data UFDC 201 is advantageously secure from user manipulation, that data may be used to satisfy any documentation requirements regarding those transactions.

Previously, a data card, such as the commonly known credit card or automatic teller machine card, is capable for storing only data identifying a given account and data related to how to contact a central data system for obtaining balances, transactional data, and the like. No financial transaction records are kept track of on the prior art card itself, either for a single account or for multiple accounts. The inability of prior art cards to store transaction data as well as balances for multiple accounts makes the job of reconciling account balances or financial planning difficult. Indeed it is difficult to obtain such data in the prior art without querying central data system 210 and incurring the transactional costs (in terms of both time and money) associated therewith.

In contrast, the present inventive UFDC furnishes such data, if requested, directly from the financial data stored in its memory. For example, the holder of UFDC 201, through an appropriate card reader 202, can query the financial data stored in UFDC 201 to obtain historical transaction records to assist in his financial planning. As another example, the user may, with respect to any one or all of the financial accounts contained in UFDC 201, obtain a monthly statement or a yearly statement for each of the financial accounts, review his spending patterns by searching transactions by categories (e.g., entertainment, groceries, and transportation), across one or more accounts perform searches of a specific transaction amount or ascertain the amount spent at a particular establishment, as well as other accounting operations, all directly from the financial data stored in UFDC 201.

The rest of FIG. 1 may be illustrated with reference to an example. When UFDC 201 is in communication with card reader 202, the user may authenticate his identity as the rightful user of UFDC 201 prior to using it to obtain goods or services. As mentioned previously, interface 206 may represent an RF/wireless communication interface in one embodiment. In which case, the communication between card reader 202 and UFDC 201 preferably commences as soon as UFDC 201 is within range of card reader 202. In one embodiment, authentication is facilitated by entering a personal identification number (PIN) using, for example, a keypad associated with card reader 202.

Card reader 202 then preferably encrypts the personal identification number (PIN) entered and sends the encrypted PIN number to UFDC 201 via interface 206 for verification. If the encrypted PIN number sent by card reader 202 compares favorably with the PIN number stored in the memory of UFDC 201, the user of UFDC 201 may begin using it to obtain goods and services or to carry out other operations with respect to the financial data stored in its memory. For example, the holder of UFDC 201 may select, using the same keypad associated with card reader 202, one of the financial accounts for operation. For the purposes of the present example, assume that the user wishes to purchase groceries using a credit card account (the selected account). Card reader 202 then contacts the central data system 210 for the selected account using the contact information stored in UFDC 201 to ascertain whether the holder of UFDC 201 is permitted to charge groceries on this account. If there is, for example, insufficient credit balance left for the amount of groceries the user wishes to purchase, central data system 210 may deny such a purchase.

The communication between a card reader 202 and a central data system 210, which is typically located at financial institutions, is accomplished via link 212. In one embodiment, link 212 represents a modem link involving either the public telephone system or dedicated data lines. It should be appreciated that there may be as many central data systems 210 as there are financial accounts stored in UFDC 201. Further, the different central data systems 210 may reside at geographically dispersed locations. Nevertheless, card reader 202 may communicate with each central data system 210 via link 212 using the appropriate contact data stored in UFDC 201.

Further, it should also be noted that central data system 210 is not necessarily involved in every operation involving UFDC 201. For example, when holder of UFDC 201 issue requests to UFDC 201 to inquire about account balances stored on card, obtaining stored transactional records, performing data analysis with respect to the financial data stored in UFDC 201, or the like, communication with central data system 210 is typically not necessary.

It should be noted that interface 206 represents a two-way communication data path between UFDC 201 and card reader 202. By way of example, card reader 202 may send to UFDC 201 information regarding the commercial establishment at which UFDC 201 is being used, the costs of goods or services being charged to a selected financial account in UFDC 201, and the like to facilitate the compilation and storage of financial transaction records in the memory space of UFDC 201. In return, UFDC 201 may furnish card reader 202 with holder information and authentication data, which may be used by the operator of card reader 202 (e.g., the commercial institution, the financial institution, or the holder of UFDC 201 himself) to compile his own data regarding the transactions.

Figure 2:
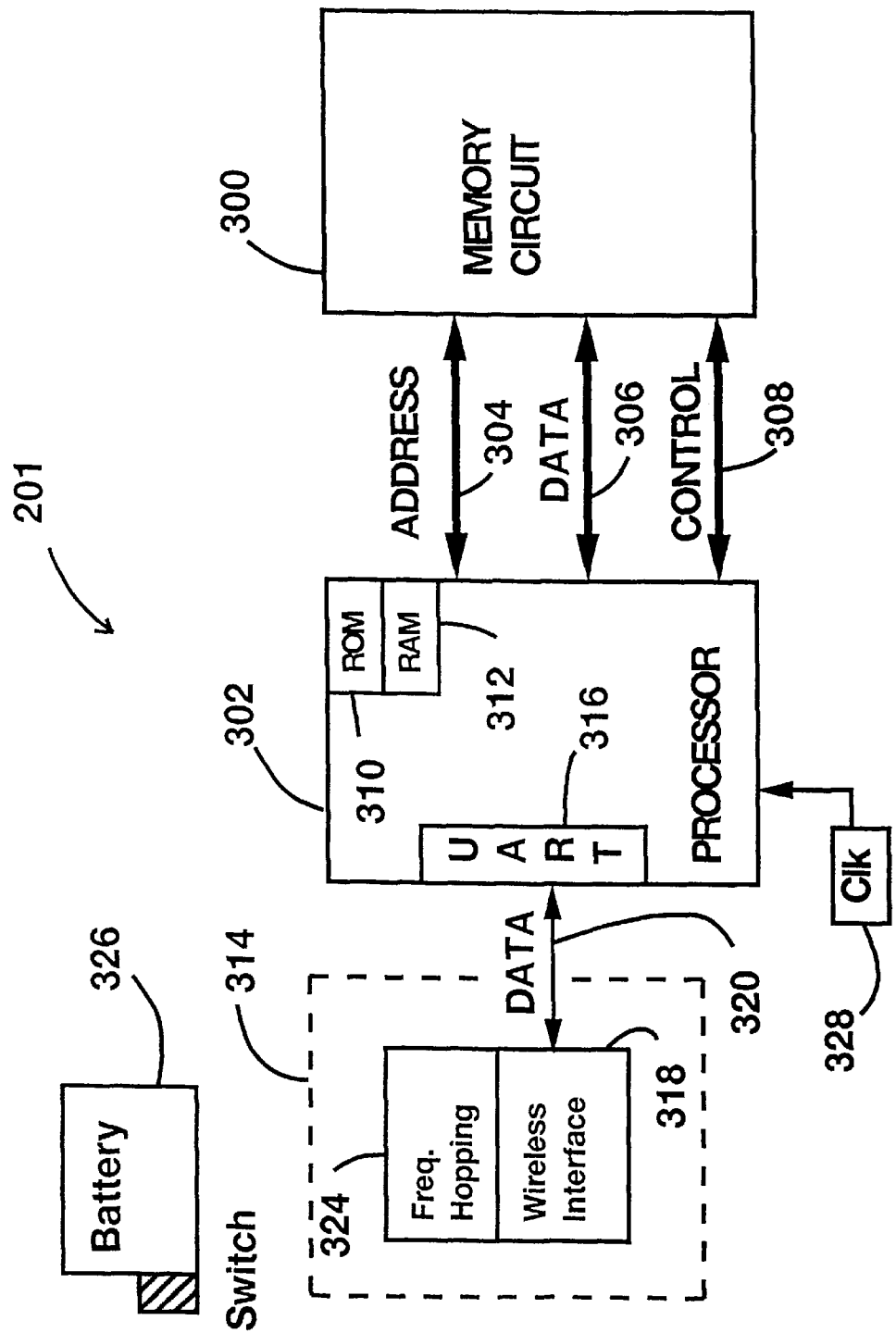
FIG. 2 shows in greater detail the universal financial data card of 1.

FIG. 2 shows in greater detail UFDC 201 of FIG. 1. In one embodiment, UFDC 201 is physically implemented in a credit card-sized package for mobility purpose. However, UFDC 201 may be physically implemented in any convenient manner, including physical packages resembling lipstick cases, pens, or the like, if so desired. In UFDC 201, there is included memory circuit 300 for storing the aforementioned financial data. Memory circuit 300 may be implemented as an EEPROM memory or as a RAM memory (preferably with battery backup) to store the financial data in a nonvolatile manner. Preferably, memory circuit 300 is implemented using flash memory technology such as the 28 F010 from Intel Corp. of Santa Clara, Calif. In one embodiment, a 128 K×8 (one megabit) flash memory circuit is utilized although 2, 4, 8 megabits or more of flash memory may be utilized if so desired to store additional data, particularly if UFDC 201 is heavily used. If each transaction takes 128 bytes (assuming the worst case scenario), memory circuit 300 is preferably designed so that it can support approximately three transactions per day for an entire year (in excess of one thousand transactions).

In one embodiment, it is contemplated that enough memory is provided to store the financial data related to one calendar year of use. At the end of the calendar year, the data in memory circuit 300 may be transferred to a new universal financial data card, allowing the old card to be stored away to preserve the historical financial data of the user.

Memory circuit 300 is coupled to processor 302 via an address bus 304, a data bus 306, and a control bus 308. In one embodiment, address bus 304 includes 16 address lines to support adequate addressing of memory circuit 300. The width of data bus 306 depends on the structure of memory circuit 300 and is preferably an 8-bit wide data bus. Control bus 308 includes such signals as READ, WRITE, SELECT, and the like. The interfacing details between a processor and its memory circuit is well-known in the art.

Processor 302 preferably includes a read only memory circuit 310 for storing the firmware and configuration data of universal financial data card 201. There is also preferably included a random access memory circuit 312, either on chip or off chip with respect to processor 302. In one embodiment, approximately 4 kilobits of read only memory 310 and around 100 bytes of random access memory 312 are provided. It is contemplated, however, that ROM 310 and RAM 312 may be of any size and ROM 310 may in fact be eliminated, if so desired, by using a small portion of memory circuit 300 in their place. In one embodiment, ROM 310, RAM 312 and memory circuit 300 may be on chip with respect to processor 302. Processor 302 may be, in one embodiment, implemented using a micro-controller, known as an 83196 micro-controller, from Intel Corp. of Santa Clara, Calif. The presence of processor 302 in UFDC 201 represents a major advantage of the inventive UFDC over previous data cards that lacks such intelligence, e.g., the commonly available credit cards that have no circuitry to process their stored data.

Processor 302 of UFDC 201 preferably communicates with a card reader using data exchange circuit 314. UART 316 represents a circuit that receives serial data and translates it into parallel data and can be on or off chip with respect to processor 302. If communication between UFDC 201 and card reader 202 is accomplished via wireless IRF interface, as is done in one embodiment, there is preferably provided wireless interface circuits 318 for utilizing the air medium for communication. Wireless interface circuit 318 takes data wirelessly from the card reader and converts it into a serial digital bitstream, which is then provided to UART circuit 316 via link 320.

In one embodiment, wireless interface 318 is implemented using transmitter known as HX2000 and receiver known as RX2010, from RF Monolithics, Inc., of Dallas, Tex.

Wireless interface 318 can operate at fixed or at various frequencies (frequency hopping). When the later case applies, frequency select circuit 324 permits wireless interface 318 to communicate with a card reader using any one of a number of pre-selected frequencies. The use of a frequency select circuit is particularly advantageous in environments such as supermarket checkouts, where adjacent card readers may operate simultaneously. By operating neighboring card readers at different predefined frequencies, however, undue interference caused by the presence of multiple card readers in a confined environment may be reduced. In one embodiment, frequency select circuit 324 preferably cycles through all permissible frequencies until it picks up a card reader signal on one of the predefined frequencies. By way of example, the predefined frequency used by a given card reader may be detected by frequency select circuit 324 when that card reader sends out the personal identification number (PIN), which is entered by the holder of UFDC 201, via its wireless/RF circuit. Frequency select circuit 324 then locks into that frequency for subsequent communication.

To further reduce interference, components within wireless interface circuit 318 and its respective interface circuits in card reader 202 are chosen so as to limit the range of communication to under a predefined range, say about 50 feet. The limitation of the transmission range provides two advantages. Firstly, the amount of power consumed by wireless interface unit 318 is advantageously reduced, thereby prolonging the life of the battery provided with UFDC 201. Secondly, undue interference from neighboring card readers and UFDC's may be reduced when their communication range is limited.

As seen in FIG. 1, there is preferably a battery 326 for providing, via an appropriate power supply circuit, the different voltage levels for operating the components of UFDC 201 of FIG. 2. A clock 328 provides a clocking frequency to processor 302.

In one embodiment, the communication between UFDC 201 and a card reader is accomplished without utilizing the RF/wireless interface. When UFDC 201 is, for example, plugged into a card reader to facilitate communication, power and clock signals can be obtained directly from the card reader (thereby eliminating the need for battery 326 and clock circuit 328). Since the RF/wireless interface is not used, frequency select circuit 324 and wireless interface circuit 318 are no longer necessary.

Figure 3:
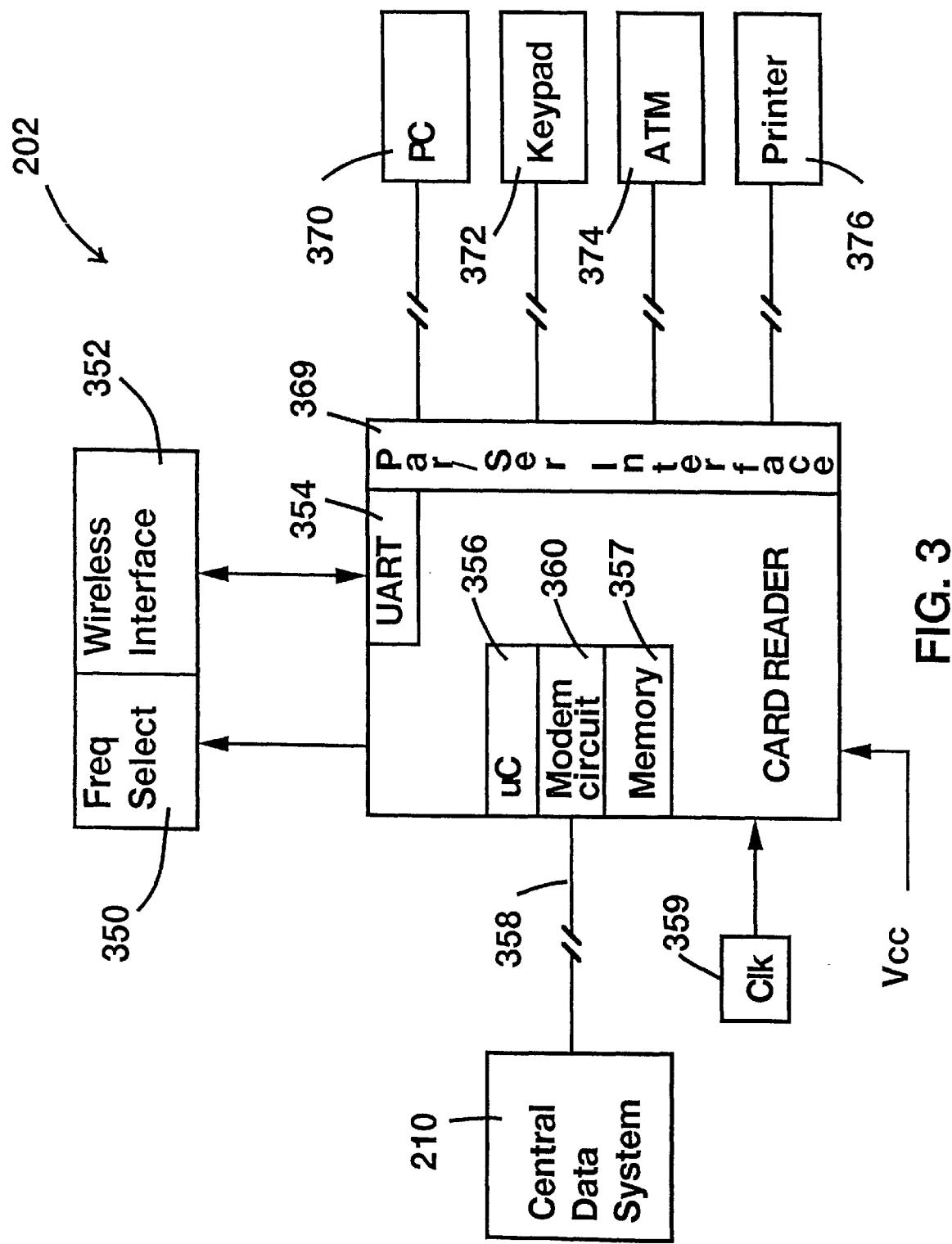
FIG. 3 shows, in one embodiment, a financial institution version of the card reader of FIG. 1.

Card reader 202 represents, in one embodiment, a high-speed modem with real-time circuitry and can be of three different configurations, depending on its application. FIG. 3 shows, in one embodiment, a financial institution version of card reader 202. In FIG. 3, card reader 202 communicates with UFDC 201 via the wireless interface by utilizing frequency select circuit 350, wireless interface circuit 352, and UART circuit 354. The operation of the aforementioned circuits has been described in connection with FIG. 2. As before, the communication between card reader 202 and UFDC 201 is preferably performed with appropriate encryption protection using, for example, processor 356 or a dedicated encryption circuit (not shown in FIG. 3). Processor 356 executes the firmware which controls the various components of card reader 202 and may be coupled to a memory 357 and a clock circuit 359 as is known in the art.

Card reader 202 may communicate with central data system 210 via link 358. In one embodiment, the communication between card reader 202 and central data system 210 is accomplished via a high-speed modem circuit 360 via telephone wires. To facilitate secure transmission of data, the communication between card reader 202 and central data system 210 may be accomplished with appropriate encryption protection, using any number of well-known encryption methods.

Card reader 202 is also optionally coupled to a plurality of peripherals devices. The communication between card reader 202 and its peripherals is preferably accomplished via parallel/serial interface 369. One such peripheral devices is computer 370, which allows the financial institution to enter the holder's name and personal information (address, social security number, phone, and the like) when opening an account. Computer 370 may also be used to enter the secret account password associated with the account issued by a financial institution, to post account balance, interest charges, financial charges, and the like, to the financial account on UFDC 201 via card reader 202. The communication between card reader 202 and computer 370 may be accomplished via serial communication although other methods of communication are not excluded.

Card reader 202 may also be coupled to a keypad 372, also preferably through a serial interface, to permit the holder to enter his personal identification number to authenticate his use. Optionally, card reader 202 may be coupled to an automatic teller machine 374 (ATM) to facilitate the dispensing of cash, to update accounts, pay bills, and the like. Card reader 202 may optionally be coupled to printer 376, either serially or parallelly, for printing receipts, checks, and the like.

Figure 4:
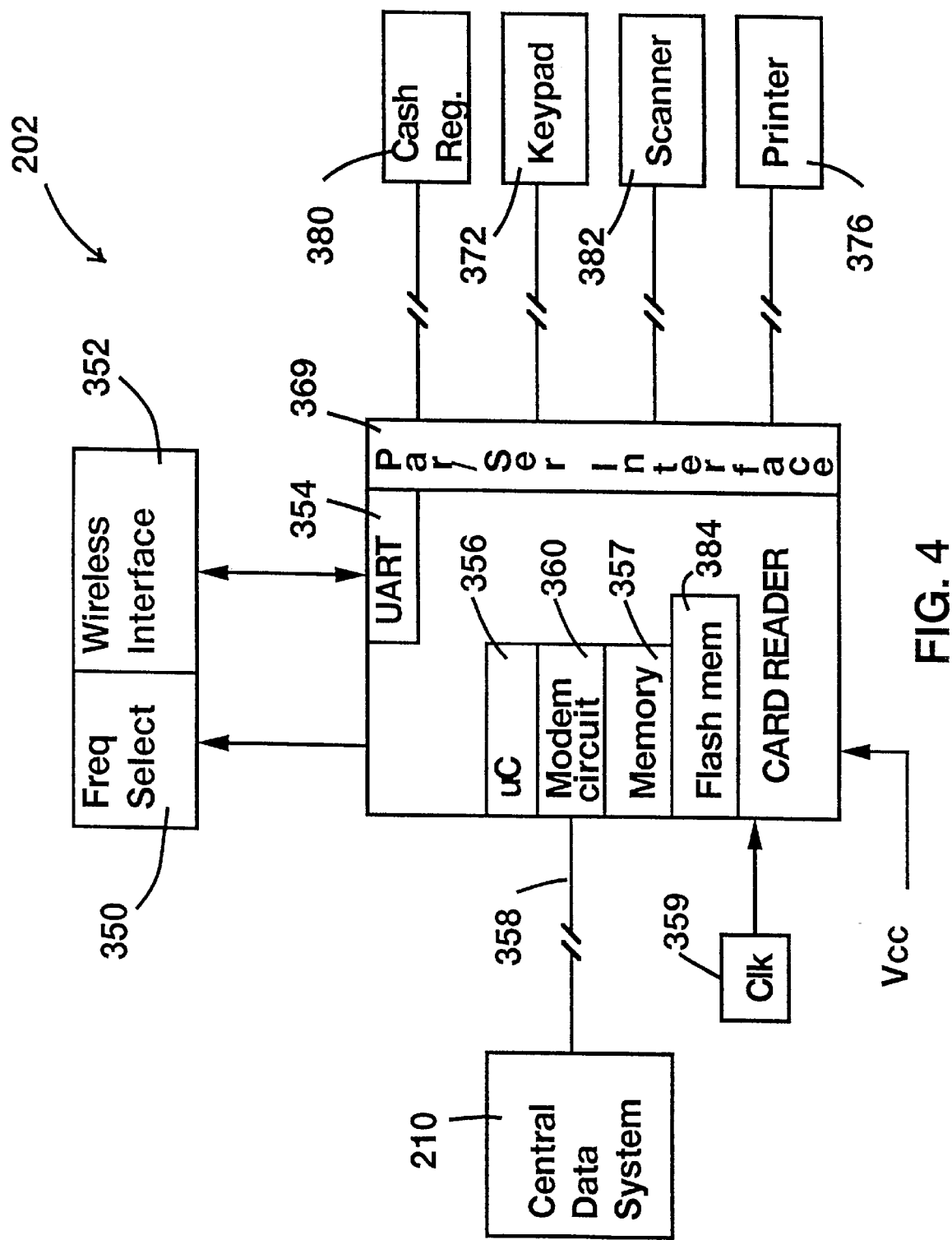
FIG. 4 shows, in one embodiment, the merchant/commercial institution version of the card reader of FIG. 1.

FIG. 4 shows the merchant/commercial institution version of card reader 202. In FIG. 4, card reader 202 coupled to cash register 380 to facilitate cash register operation in parallel with the operation of the universal financial data system (UFDS) 204. Card reader 202 is also shown optionally coupled to a scanner 382 for scanning in pricing data and inventory data regarding the goods/services obtained by the holder of UFDC 201. Note that pricing data/inventory data regarding the goods/services may be either scanned in via scanner 382 or entered manually via keypad 372. In one embodiment, the pricing/inventory data may be stored in a memory area 384 (preferably non-volatile utilizing flash memory technology). For inventory and financial control purposes, this data may be read on a daily, weekly, monthly, quarterly or annually by the operator of card reader 202.

Advantageously, memory circuit 384 may also be used to store the name of the commercial establishment at which card reader 202 is located, as well as the date, the time, the type of goods or services purchased by the holder of UFDC 201, for transmitting that data to UFDC 201 to be included in the stored financial transaction record. In this manner, this information does not have to be manually keyed in by the operator of card reader 202 for every transaction. Alternatively, that data may be entered manually via keypad 372 which, in one embodiment, represents an alpha-numeric keypad.

Figure 5:
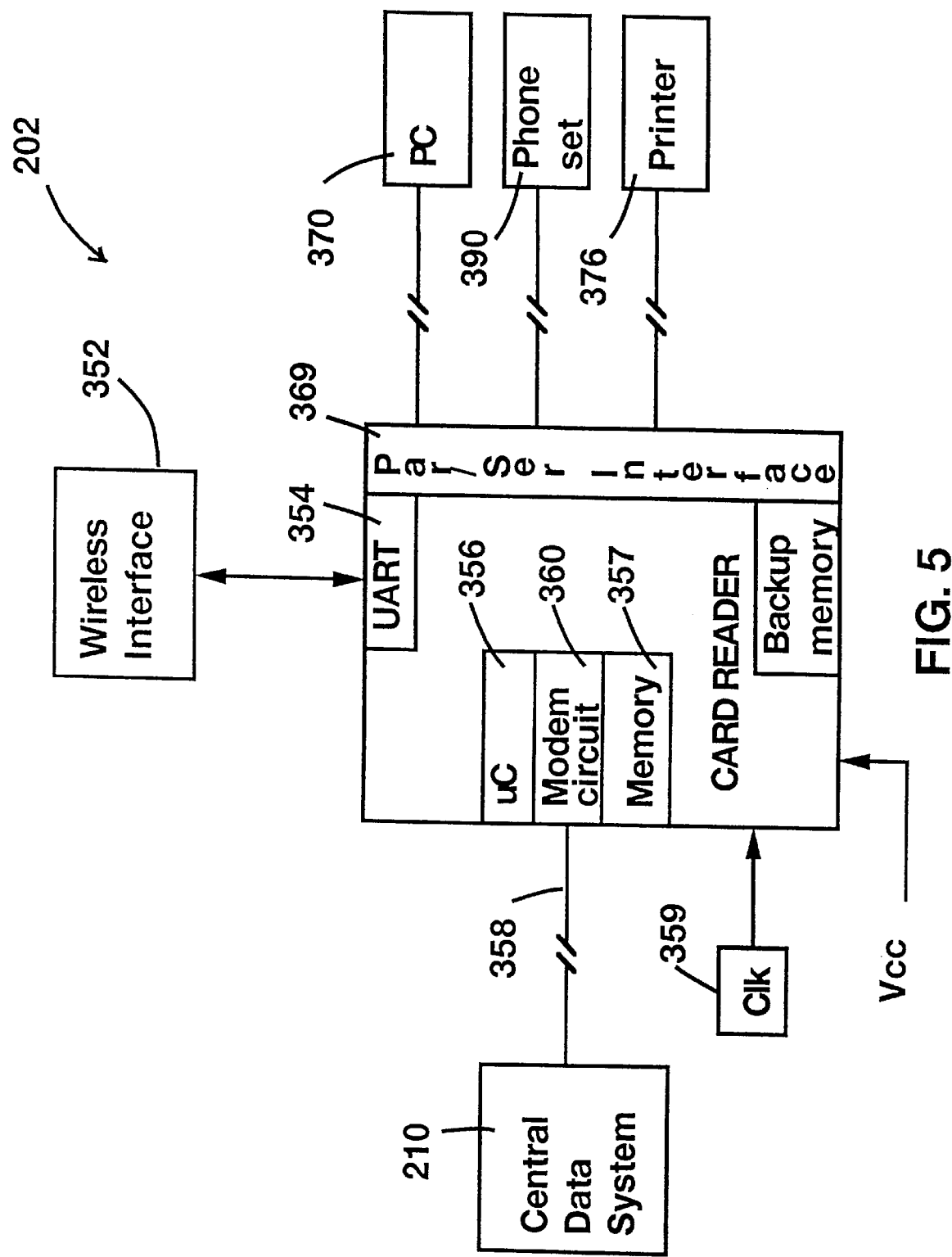
FIG. 5 shows, in one embodiment, a residential version of the card reader of FIG. 1.

FIG. 5 shows a residential version of card reader 202 in accordance with one aspect of the present invention. Note that card reader 202 of FIG. 5 preferably does not include the frequency select circuit 350 (seen in FIGS. 3 and 4), since there is typically only one card reader residing at the card holder's residence. Via computer 370, the card holder can retrieve account information such as balance, payable party, date, amount, checks written, monthly/yearly statements, monthly/yearly spreadsheet, and to perform operations involving the financial accounts stored in UFDC 201, such as home banking, automatic payments, and the like.

Printer 376 may be used to print checks, monthly/yearly statements, spreadsheet charts, business expenses, and the like from the financial data stored in UFDC 201. In one embodiment, in place of computer 370, card reader 202 is optionally coupled to telephone set 390 through which audio data relating to the financial account stored in UFDC 201 may be listened to by the holder of UFDC 201. The representation of digital data in an audio format is known in the art.

The residential card reader 202 of FIG. 5 also preferably includes backup memory 392, which is preferably but not necessarily nonvolatile, for performing data backup of UFDC 201. Data backup may be performed periodically, on demand, or automatically, as desired. Advantageously, the data within backup memory 392 may be used to create a replacement universal financial data card (UFDC) in case the original UFDC 201 is lost or stolen. In this manner, it is thus unnecessary for the holder of UFDC 201 to re-create the data through the financial institutions and commercial establishments, thereby reducing costs and delays associated with such tasks. Memory 392 is preferably non-volatile.

Figure 6:
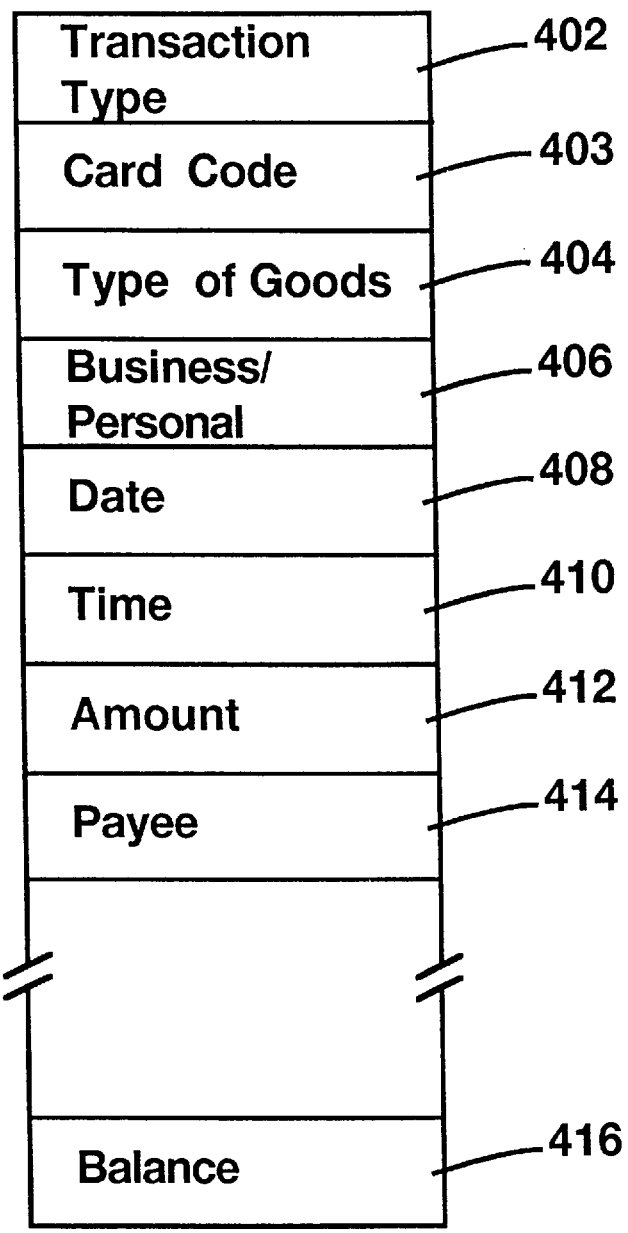
FIG. 6 shows examples of data fields that make up a financial transaction record to be stored within the memory space of the universal financial data card.

FIG. 6 shows examples of data fields that make up a financial transaction record to be stored within the memory space of universal financial data card 201. As shown in FIG. 6, a financial transaction record is preferably stored as a string of bytes, each of which representing a data field. It should be appreciated that the fields shown in FIG. 6 are only illustrative and not all transactions require all the fields shown in FIG. 6. Likewise, additional fields may be provided depending on need. Further, different account types and different transactions may result in financial transaction records of different lengths, since not all financial transaction records have an identical number of fields.

Field 402 is preferably a byte representing the transaction type, e.g., deposit, withdrawal, payment by check, and the like. Field 404 is preferably another byte that stores the code representing the type of service or goods purchased, e.g., car payment, groceries, mortgage, tax, and the like for assisting the user to categorize transactions according to types. Field 406 is an optional field for indicating whether the transaction record relates to a personal or a business expense, e.g., for tax purposes.

Field 408 represents, in one embodiment, 3 bytes for storing the date of the transaction; field 410 stores the time; field 412 stores the amount; field 414 stores the payee, and field 416 stores the balance of the account associated with this financial transaction record. In one embodiment, the balance in balance field 416 is updated substantially instantaneously within UFDC card 201 as the transaction takes place. At about the same time, the central data system 210 is also updated to reflect the changing balance.

In one embodiment, card reader 202 may send to central data system 210 the amount of the goods/services to be charged to ascertain whether there is sufficient balance remaining in the selected financial account to cover the intended purchase. At the same time, if there is any reconciliation to be made to the balance of the financial account between central data system 210 and UFDC 201 (i.e., due to the imposition of service charges, the addition of interest dividends, direct deposit, and the like that has not been updated with UFDC 201), the reconciliation may be made with the central data system 210 via the card reader 202 at the time the transaction takes place.

To save memory space in UFDC 201, financial transaction records pertaining to a certain financial account are preferably arranged in the memory space of UFDC 201 such that there would be no need to repeat for every transaction information or data identifying the financial account impacted. As will be seen later, the inventive serial and parallel data storage schemes accomplish this by via their unique directory structures.

Table 1 shows examples of command codes or transaction types that are typically found in field 402 of FIG. 6. Table 2 are examples of card codes that are typically found in field 403 of FIG. 6, while Table 3 shows examples of codes representing types of services or goods that are typically found in field 404 of FIG. 6. For ease of understanding, examples of how those codes are utilized in creating financial transaction records are shown in Tables 1–3. It should be kept in mind, however, that the specific codes given in Table 1, 2, and 3 are shown only for illustration purposes and their specific values may change from implementation to implementation without departing from the scope and spirit of the invention disclosed herein. Further, not all the codes given in Tables 1–3 may be necessary for some card holders. For others, additional codes may be required to satisfy their financial data requirements.

TABLE 1

CMD CODE or TRANSACTION TYPE

| | | |
|---|---|---|
| TYPE 1: (Not required) | 01h = | 02h = |
| 00h = NULL COMMAND | 04h = CARD HOLDER INFORM. | 05h = ACCOUNT INFORM. |
| 03h = CARD NAME REQUEST | 07h = ACC. CREDIT LIMIT | 08h = LIST ACC. ACTIVITY |
| 06h = ACCOUNT BALANCE | 0Ah = LIST INTEREST PAID | 0Bh = LIST INTEREST EARNED |
| 09h = LIST ALL ACCOUNTS | 0Dh = | 0Eh = |
| 0Ch = LSIT SERVICE FEE | | |

Command Format:/ComCode/
    Ex: 07 (To inquire about Account Balance)
        08 (List Account Activity)

TYPE 2: (ComCode + 1 argument

| | | |
|---|---|---|
| 40h = ECHO BACK CMD. | 41h = HOLDER NAME ENTRY | 42h = HOLDER NAME UPDATE |
| 43h = HOLDER NAME VERIFY | 44h = HOLDER PASS. ENTRY | 45h = HOLDER PASS. UPDATE |
| 46h = HOLDER PASS. VERIFY | 42h = HOLDER ADDR. ENTRY | 48h = HOLDER ADDR. UPDATE |
| 49h = HOLDER PHONE ENTRY | 4Ah = HOLDER PHONE UPD. | 4Bh = BANK PASS. ENTRY |
| 4Ch = BANK PASS UPDATE | 4Dh = BANK PASS VERIFY | 4Eh = BANK NAME ENTRY |
| 4Fh = BANK NAME UPDATE | 50h = BANK ADDR. ENTRY | 51h = BANK ADDR. UPDATE |
| 52h = BANK PHONE ENTRY | 53h = BANK PHONE UPDATE | 54h = CHECK AMOUNT SEARCH |
| 55h = PAYEE NAME SEARCH | 56h = CHECK DATE SEARCH | 57h = DRAFT NUMBER SEARCH |
| 58h = INTEREST CHARGE | 59h = SERVICE FEE | 5Ah = INTEREST EARNED |
| 5BH = MON/YEAR STATEMENT | 5Ch = | |

Command Format:/ComCode/String/
    Ex: 41 John Doe (To enter Name John Doe into a blank card)
        47 1299 Washington Rd. Sacramento, CA 95628 (To enter Address of Card Holder
        55 Safeway (Search for all checks written to Payee Named Safeway)

| | | |
|---|---|---|
| TYPE 3: ComCode + 2 arguments | 71h = WITHDRAW COMMAND | 72h = CREDIT LIMIT COMMAND |
| 70h = DEPOSIT COMMAND | 74h = | 75h = |
| 73h = AFDC DEPOSIT COMMAND | | |

Command Format:/Transaction Type/Date Time/Amount/
    Ex: 70 6-11-1995 10:31 $250.00 (Deposit $250 into Account at 10:31 AM
on June 11, 1995)
        72 7-10-1994 14:20 $1500.00 (Maximum Credit to Account is $1,500.00.
Date July 10, 1994 at 2:20 PM)

TYPE 4:

| | | |
|---|---|---|
| 90h = OPEN ACCOUNT CARD | 91h = ACC NUMBER UPDATE | 92h = ACCOUNT NUMBER VERIFY (ACC. SELECT CMD) |

Command Format:/CommandCode/CardCode/Date Time/AccountNumber/
    Ex: 90 00 6-1-1995 11:21 572-10-1194 (Open Checking Account on June 1,
1995 at 11:21 AM. Account Number is 572-10-1194)

TYPE 5:

| | | |
|---|---|---|
| B0h = CREDIT CHARGE PAYMENT | B1h = PAY BY CHECK | B2h = CHARGE (PAY) BY CREDIT |
| B3h = PAY BY FOOD STAMPS | B4h = PAY BY CASH | B5h = |

Command Format:/TransactionType/ServiceType/Date Time/Amount/Payee Name/
    Ex: B1 01 6-1-1995 9:30 $50.00 Lucky (Check written to Lucky on June 1, 1995
at 9:30 AM in the Amount of $50.00 for Groceries)
        B2 07 8-10-1994 14:20 $75.00 Dr. S. Johnson (Charge Payment to Dr. S.
Smith on August 10, 1994 at 2:20PM for Medical Service)

TYPE 5A:

| | | |
|---|---|---|
| D0h + STOCK PURCHASE RECORD | D1h = STOCK SELLING RECORD | D2h = STOCK NAME BALANCE |

Command Format:/TransactionType/Date Time/Number of Shares/Amount (Cost)/
Stock Name/
    Ex: D0 6-5-1995 9:30 250 $25000.00 Intel (Bought 250 shares of Intel stocks for
$25,000 on June 5, 1995 at 9:30AM)
        D1 8-15-1995 14:20 1000 $7500.00 AMD (Sold 1000 shares of AMD
stocks for $7,500 on August 15, 1995 at 2:20PM)

TABLE 2

CARD CODE

| | | |
|---|---|---|
| 00h = CHECKING ACCOUNT | 01h = SAVING ACCOUNT | 03h = AFDC ACCOUNT |
| 03h = CASE ACCOUNT | 04h = VISA ACCOUNT | 05h = MASTER CARD ACCT. |

TABLE 2-continued

CARD CODE

| | | |
|---|---|---|
| 06h = DISCOVERY ACCOUNT | 07h = AMERICAN EXPRESS | 08h = GAS CHARGE ACCOUNT |
| 09h = TELEPHONE CARD ACC. | 0Ah = MEDICAL ACCOUNT | 0Bh = SECURITY (STOCK) ACCOUNT |
| 0Ch = CHARGE ACCOUNT | 0Dh = | |

TABLE 3

TYPE OF SERVICE (GOODS)

| | | |
|---|---|---|
| 00h = MISCELLANEOUS | 01h = GROCERY | 02h = GASOLINE |
| 03h = HOUSEHOLD SUPPLY | 04h = HOUSEHOLD REPAIR | 05h = AUTO SUPPLY |
| 06h = AUTO SERVICE | 07h = MEDICAL | 08h = DENTAL |
| 09h = TELEPHONE | 0Ah = UTILITY | 0Bh = MORTGAGE |
| 0Ch = AUTO EXPENSE | 0Dh = RENT | 0Eh = GARDEN SUPPLY |
| 0Fh = CLOTHING | 10h = ENTERTAINMENT | 11h = RESTAURANT |
| 12h = APPLIANCES | 13h = INSURANCE | 14h = TAX (PROPERTY) |
| 15h = INTEREST PAID | 16h = CHILD CARE | 17h = CREDIT CARD PAYMENT |
| 18h = WORK EXPENSE | 19h = SCHOOL (TUITION) | 1Ah = OFFICE EXPENSE |
| 1Bh = STATIONARY | 1Ch = TRAVEL | 1Dh = VACATION |
| 1Eh = PET EXPENSE | 1Fh = | |

One challenge in the design of an efficient universal financial data card involves the efficient storage of a large amount of data relating to multiple financial accounts from different financial institutions, as well as their growing financial transaction records. It should be appreciated that additional account data and financial transaction data may be added at any given time during the useful life of UFDC 201. As mentioned earlier, these pieces of data may be variable in length. To be optimal, it is preferable that proposed recording methods facilitate the storage of financial transaction records with a minimum number of redundant data bytes. Further, it is highly preferable to pack data together as tightly as possible so as to eliminate as much of the wasted unused memory space between data records as possible.

To illustrate, suppose memory 300 is divided into blocks, one of which is used to store the data related to the holder of UFDC 201, with each of the remaining blocks devoted to storing data relating to a single financial account and its financial transaction records. If one account is used more frequently than another, however, this method results in an inefficient use of memory space since some blocks would be completely filled with financial transaction records while others remain partially empty.

Figure 7:
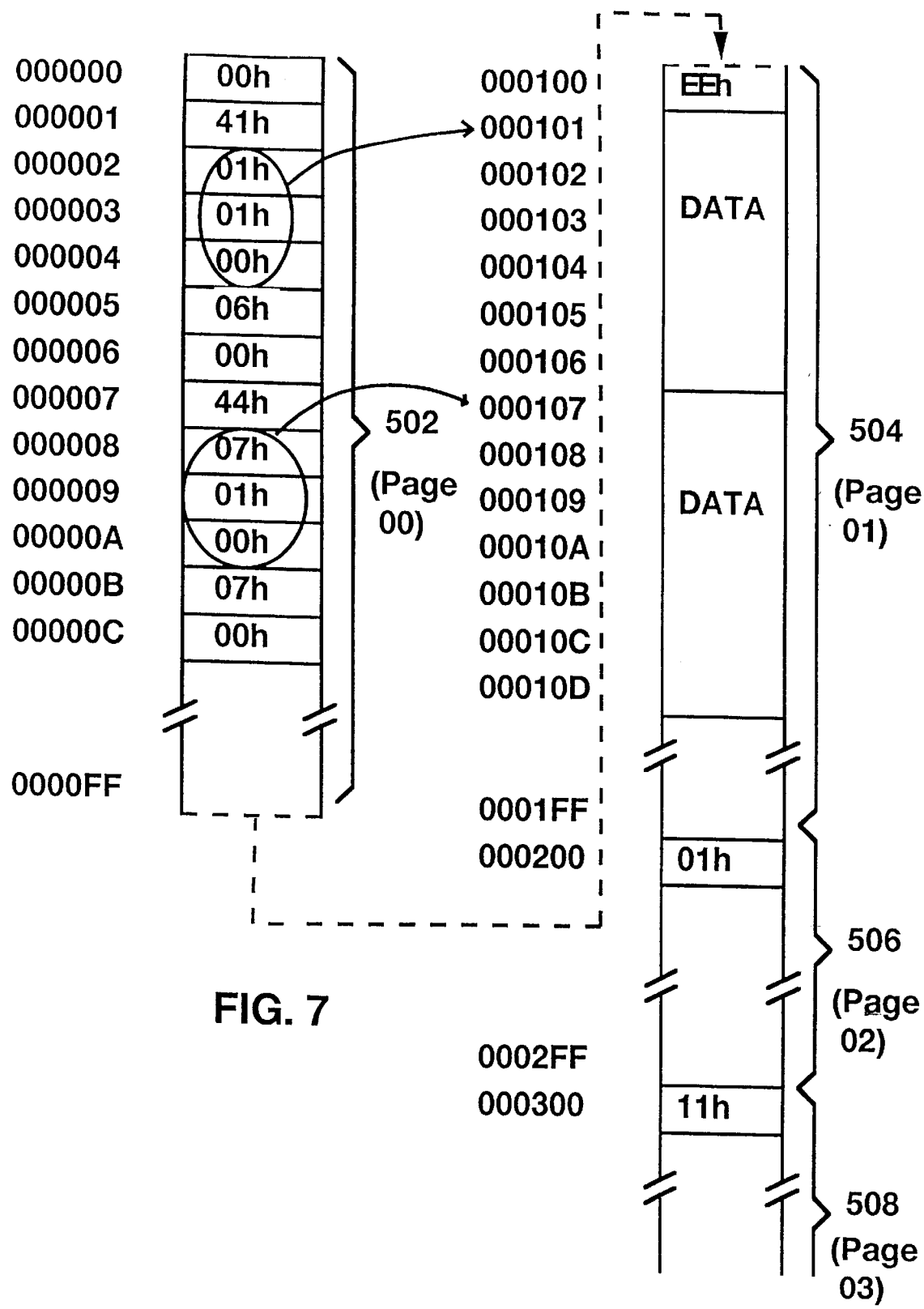
FIG. 7 illustrates a parallel recording scheme, in accordance with one aspect of the present invention, wherein financial transaction records are stored as linked data chains.

To address the aforementioned challenge, FIG. 7 illustrates a parallel recording scheme, in accordance with one aspect of the present invention, wherein financial transaction records are stored as linked data chains. Referring now to FIG. 7, the memory space 500 of memory circuit 300 of UFDC 201 is organized into pages, preferably of equal lengths. Pages may be of any size. In one embodiment, for example, a page is 100 hex byte long (multiple of 10 hex bytes) for ease of programming.

The address location of the first byte of each linked data chain (each linked data chain represents a financial transaction record) is kept track of in a link entry. Link entries that point to related data are grouped together and stored in specially designated pages, known as directory pages, of memory circuit 300. In FIG. 7, four pages 502, 504, 506, and 508 are shown for illustration purposes. Each page is identified by page type code, which is typically stored at the first memory location of the page. A page type code represents a predefined code for identifying the content of that page. For example, page 502 is identified by page type code 00h; page 504 is identified by page type code EEh; page 506 identified by page type code 01h, and page 508 is identified by page type code 11h.

Table 4 shows examples of page type codes in accordance with one embodiment of the present invention. For example, page type code 00h denotes that a page identified by page type code 00h contains directory data for card holder information. In other words, link entries within that page contain address values, which in turn represent the first memory locations of data strings pertaining to the holder of the universal financial data card. Such data strings may contain, for example, the name, personal identification number, address, telephone number, and other personal data. Similarly, a page identified by page type code 01h contains link entries which point to the first address locations of data strings pertaining to the bank data of a given financial institution, say bank X (the use of the word "bank" herein refers generically to financial institutions). Such bank data may include information such as bank name, password, account number, bank address, bank telephone number, and the like. Note that a bank password represents a password known only to the specific financial institution that issues it and is provided to prevent access by one financial institution to the financial accounts issued by other financial institutions.

TABLE 4

PAGE TYPE CODE OF PARALLEL DECODING SCHEME

| | |
|---|---|
| 00 = | CARD HOLDER DIRECTORY (Points to data entry area which contains card holder information such as: name, PIN, address, telephone, personal, . . . ) |
| 01 = | BANK #1 INFORMATION DIRECTORY (Corresponding to Acc. #1) (Points to data entry area which contains Bank #1 information such as: bank name, password, account number, bank address, bank telephone, . . . ) |
| 02 = | BANK #2 INFORMATION DIRECTORY |
| 0F = | BANK #F INFORMATION DIRECTORY |
| 11 = | ACCOUNT #1 INFORMATION DIRECTORY (Corresponding to Bank #1 ) (Points to data entry area which contains Account #1 information such as: type of goods or service, date, time, transaction amount, name of payee, draft number, . . . ) |
| 12 = | ACCOUNT #2 INFORMATION DIRECTORY |
| 1F = | ACCOUNT #F INFORMATION DIRECTORY |
| 20 = | NOT USED |
| ED = | NOT USED |
| EE = | DATA ENTRY AREA (Account entry data area) |
| EF = | NOT USED |
| FE = | NOT USED |
| FF = | BLANK PAGE |

In one embodiment, link entries for up to sixteen banks (between 01h and 0Fh) can be stored on a directory page on a universal financial data card. However, these specific values are merely illustrative and may be modified to facilitate storage of data related to a greater number of banks if necessary.

In accordance with the present example, a page identified by page type code 11h includes link entries pointing to the data entry area containing transactional data related to a given account, say account Y. As mentioned earlier, the transactional data may include the type of goods or services, date of the transaction, time, transaction amount, name of payee, draft number, and the like. In this embodiment, account Y is understood to be associated with or issued by bank X since the least significant bit of the page type code of the page containing link entries to the data related to bank X (which page type code is 01h) is the same as the least significant bit of the page type code of the page containing link entries to the data related account Y (which page type code is 11h). In this manner, a given account is understood to be associated with a given financial institution if the least significant bit of the page type code of the page containing link entries to data related to that bank is the same as the least significant bit of the page type code of the page containing link entries to the data related to that account. Since this association is made in the structure of the directory pages, it becomes unnecessary to repeatedly identify the bank with which a given account is associated when financial transaction records are compiled and stored. Advantageously, memory saving is achieved.

Page type code EEh is arbitrarily chosen in this embodiment to denote a page wherein data can be stored. Any type of data may be stored in a page identified by page type code EEh (e.g., card holder data, bank data, or account transaction data). As the term is used herein, a directory page refers to a page containing link entries. On the other hand, a data page represents a page in which the actual data pointed to by the address links in the link entries are stored.

Referring back to FIG. 7, the parallel recording scheme may be more readily understood with reference to an example. In page 502, page type code 00h identifies this page as a directory page containing link entries pointing to the card holder information data area. Following page type code 00h, a command code 41h may be stored in location 01h. Reference to Table 1 indicates that command code 41h represents a command code for a holder's name entry.

The next three bytes following command code 41h represent the address link to the holder name. In this example, the address link to the holder's name reads 000101h (the address link itself resides in memory location 02H–04H). This address location (000101h) is found in page 504, which is identified by page type code EEh as a data page (refer to Table 4 for the definition of page type codes). The string representing the holder's name itself (e.g., John Doe), may be stored in location 000101h and subsequent bytes within data page 504. The last two bytes of the link entry represents the data length (byte count).

As a further example, memory location 07h contains a command code 44h which, by referencing Table 1, is shown to represent the holder's password entry. The next three bytes, i.e., 08h–0Ah, contains the address link to the data string representing the holder password or personal identification number (PIN). In the example of FIG. 7, the memory location where the actual string representing the holder password is actually stored is shown to be 000123h. Memory location 000123h is found to be in data page 504. From location 000123h on, the string representing the holder password may be stored.

If the string exceeds the length of the remaining memory space of data page 504, another page, e.g., the first blank page encountered going from low memory to high memory, may be used to write the remaining holder password data string. Of course, this newly created data page should be identified with the appropriate page type code, i.e., page type code EEh in this example.

Likewise, if there are more address links related to card holder information than can be contained within directory page 502, the next blank page encountered (going from low memory to high memory) may be used to store the additional address links related to the card holder information. Again, this newly created page should be identified by an appropriate page type code, e.g., page type code 00h in this example. In this manner, when it is necessary to search for transaction data related to the holder information, all pages identified by page type code 00h may be searched for their address links to the relevant data. If a page boundary is encountered while reading data, the next page with the same page type code, i.e., EEh, may be ascertained from which the remaining data may be obtained (up to the termination byte in one embodiment).

If data related to bank information, e.g., bank #1, needs to be stored, a blank page may be designated with page type code 01h for storing groups of six link bytes (the link entries) to the bank information. Again, the first byte of the link entry represents the command code (see Table 1 for definition), whereas the next three bytes of the link entry represents the address link, which points to the actual location in a data page (identified by page type code EEh) where the data actually resides, and the last two bytes represent the entry length in byte count. Note that three bytes (24 bits) of address links will support up to eight megabytes of memory space. To support additional memory space, additional bytes may be allocated to the address links as appropriate.

In the same manner, transactions related to account #1 may have their link entries stored in a directory page identified by page type code 11h. It should be apparent from the foregoing discussion that account #1 is associated with bank #1 by virtue of the similarity in the least significant bits of the respective page type codes identifying their directory pages. As more transactions are generated, additional link entries pointed thereto may be created, all of which may be stored in pages identified by page type code 11H. Note that the use of this parallel recording scheme flexibly permits additional data to be added to the memory space page-by-page from low memory to high memory in a highly efficient manner. Further, since each transaction has its own link entry in a directory page for the relevant account, if one address link is corrupted then only that transaction is affected. The transactions pointed to by the next link entries in the same directory page is unaffected and may be recovered for use.

Figure 8:
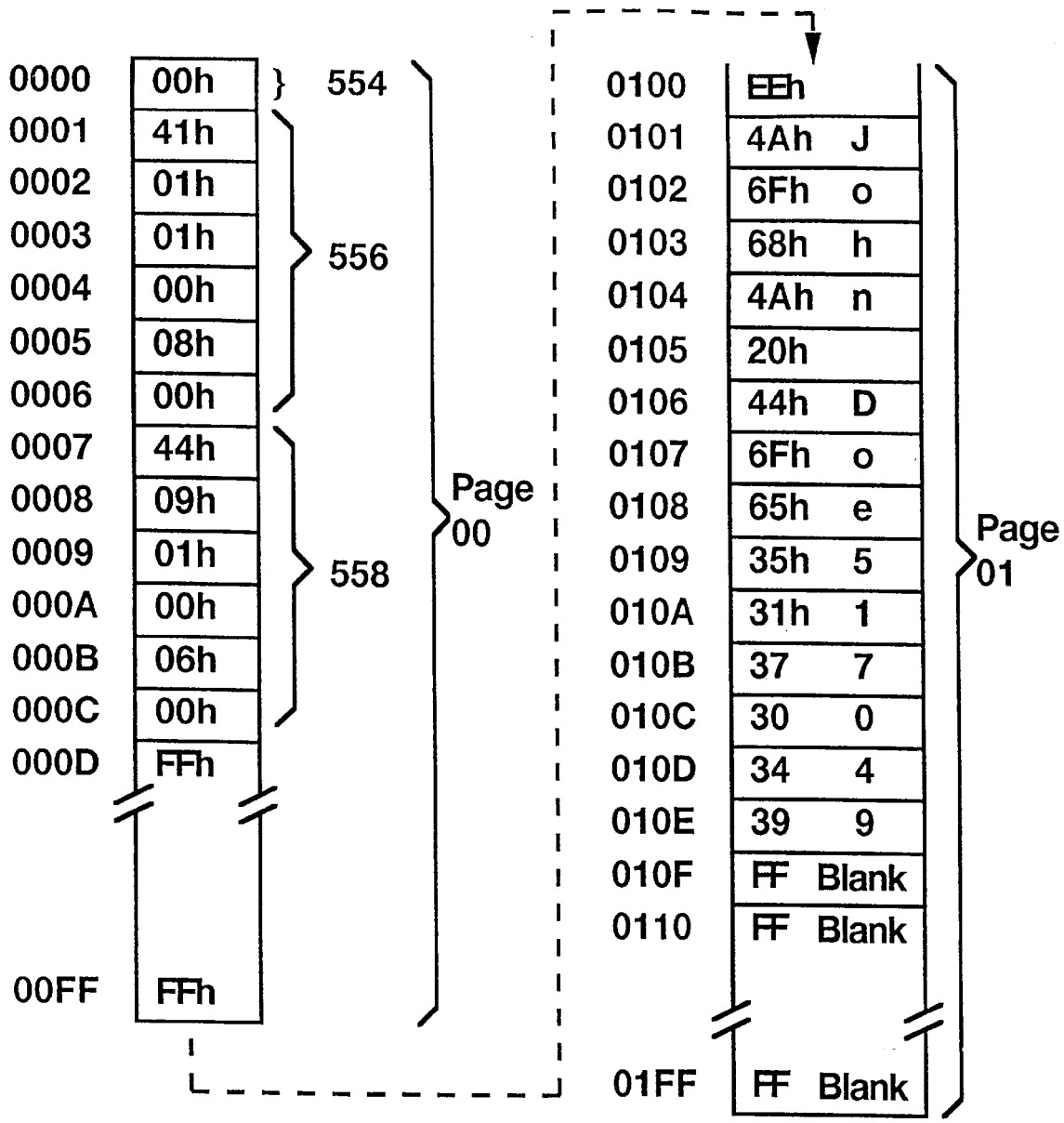
FIG. 8 shows an example of the memory space of the memory circuit within the universal financial data card showing two pages.

To further illustrate, FIG. 8 shows an example of memory space 500 of memory circuit 300 in which two pages 550 and 552, are shown. Block 554 indicates that page 550 is a directory page containing link entries for holder's data (indicated by command code 00h pursuant to Table 1). Block 556 is the first link entry and block 558 represents the second link entry for data related to the card holder. The remainder of page 550 is shown to be blank for ease of illustration.

The first memory location of block 556 indicates that this link entry relates to card holder name entry command (indicated by command code 41h), and the next three bytes of block 556 are address links, which indicate that the card holder name can be found at address location 000101h. This address location and subsequent bytes are used for storing the string "John Doe" (shown in FIG. 8 in both the text and ASCII format). And the last two bytes are byte count, which is 0008h in this example. Block 558 is the link entry to the holder's password entry (indicated by command code 44h) and the memory location where the holder's password is actually stored is 000109h. In this example, this password is shown to be 517049 and number of byte entry (byte count) is 0006h.

Figure 9:
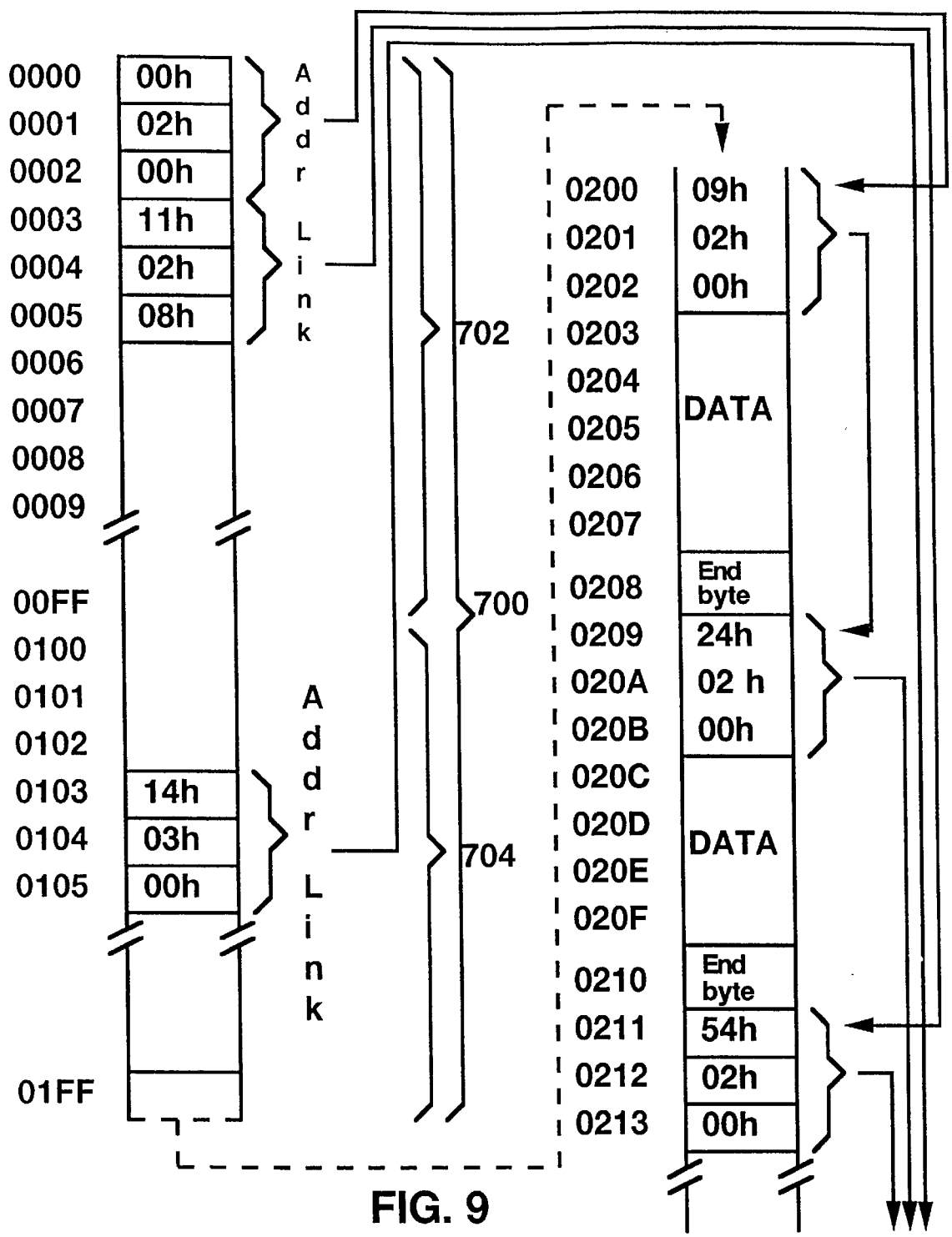
FIG. 9 shows an example of a serial recording scheme for recording financial data, including financial transaction records and account data, for multiple accounts issued by different financial institutions in accordance with one aspect of the present invention.

FIG. 9 shows an example of a serial recording scheme for recording financial data, including financial transaction records and account data, for multiple accounts issued by different financial institutions in accordance with one aspect of the present invention. The serial recording scheme is different from the parallel recording scheme in that all financial transaction records pertaining to a given financial account is stored as one continuous linked data chain. In contrast, each financial transaction record in the parallel recording scheme is stored as a separate linked data chain and is identifiable by a link entry in a directory page.

Utilizing the serial recording scheme, one end of the link data chain representing all financial transaction records associated with a given account is identified by a link byte in the directory portion designated for storing link entries for financial transaction records. Similarly, bank information or account information are stored as linked data chains, having one end identified by a link byte in the appropriate directory portion of the memory. The directory resides in the lower memory area while the data recording area takes up the rest of memory space 300.

In one embodiment, the directory portion 700 is divided into two pages, 702 and 704. Page 702 contains link entries to the information related to the card holder/bank while page 704 contains the link entries to the accounts. In one embodiment, the account data pointed to by the link entry at memory locations 103h–105h is understood to be related to the bank data pointed to by link entries at memory locations 03h–05h. Similarly, the account data pointed to by link entries at memory locations 106 h–08h is understood to be related to the bank data pointed to by link entries at memory locations 06h–08h. In this manner, the association between an account and its bank is advantageously indicated by the locations of their respective link entries in the directory pages.

In the example of FIG. 9, the first link entry (three link bytes) of page 702 is assumed to point to the first data entry for the card holder information (starting at memory location 000200h). Starting at memory location 000200h, the first three memory locations are in turn reserved for storing the address value, that points to the memory location of the next entry of the card holder information (starting at memory location 000209h in the present example). In turn, the first three memory locations starting at memory location 000209h are reserved for storing an address value, again effectively pointing to the memory location of the next entry of the card holder information (starting at memory location 000224h in the present example).

In one example, the first entry of the holder information may represent the holder's name, the second entry the holder's personal identification number, and the third entry the holder's residence address. Note that the actual memory location values shown in FIG. 9 are chosen only for illustration purposes and may vary depending on the length of the data strings to be stored.

Referring back to page 702 of FIG. 9, the remaining memory location areas of directory page 702 are devoted to link entries to bank information. For example, memory locations 03h–05h contain link entries to the first data entry of the first bank. In the example of FIG. 9, the first data entry related to the first bank is shown to be stored at memory location 000211h. Again, the first three bytes at that memory location is reserved for storing the address value that points to the second entry of the bank information (shown to begin at memory location 000254h in FIG. 9). In one example, the first data entry of bank information may represent the bank's name wherein the second data entry may represent the bank's address.

Page 704 is reserved for link entries to account data and account transactions. As mentioned previously, it is preferable that the directory structure indicates the relationship between an account and its issuing financial institution to avoid repeating the financial institution information over and over in financial transaction records. In the example of FIG. 9, memory locations 103h–105h contain the link entry to the first data entry of account information for account #1 (which is issued by the financial institution pointed to by memory locations 03h–05h). As shown, the first data entry for the account information related to account #1 is stored at memory location 000314h. Again, the first three memory locations following that address 000314h is reserved for storing the address link to the next entry related to the account information and/or financial transaction data related to account #1. In this manner, as financial transactions occur, the linked data chain grows with each new financial transaction record being pointed to by the first three memory locations of the previous financial transaction record. In turn, the new financial transaction record has its first three bytes reserved for pointing to the next financial transaction record to be created.

It should be appreciated from the foregoing that the sizes of pages 702 and 704 are merely illustrative and may be adjusted to accommodate as many banks and accounts as desired. Further, as data is stored (e.g., see memory locations 000203h–000207h in FIG. 9), the first byte of that data is preferably a command code or transaction type (examples of which are shown in Table 1), to be followed by the string of data representing the financial transaction record. The string of data is preferably, but not necessarily, terminated with an appropriate termination byte to signal the end of the data string. An example of a suitable financial transaction record may be found in, for example, FIG. 6.

Figure 10:
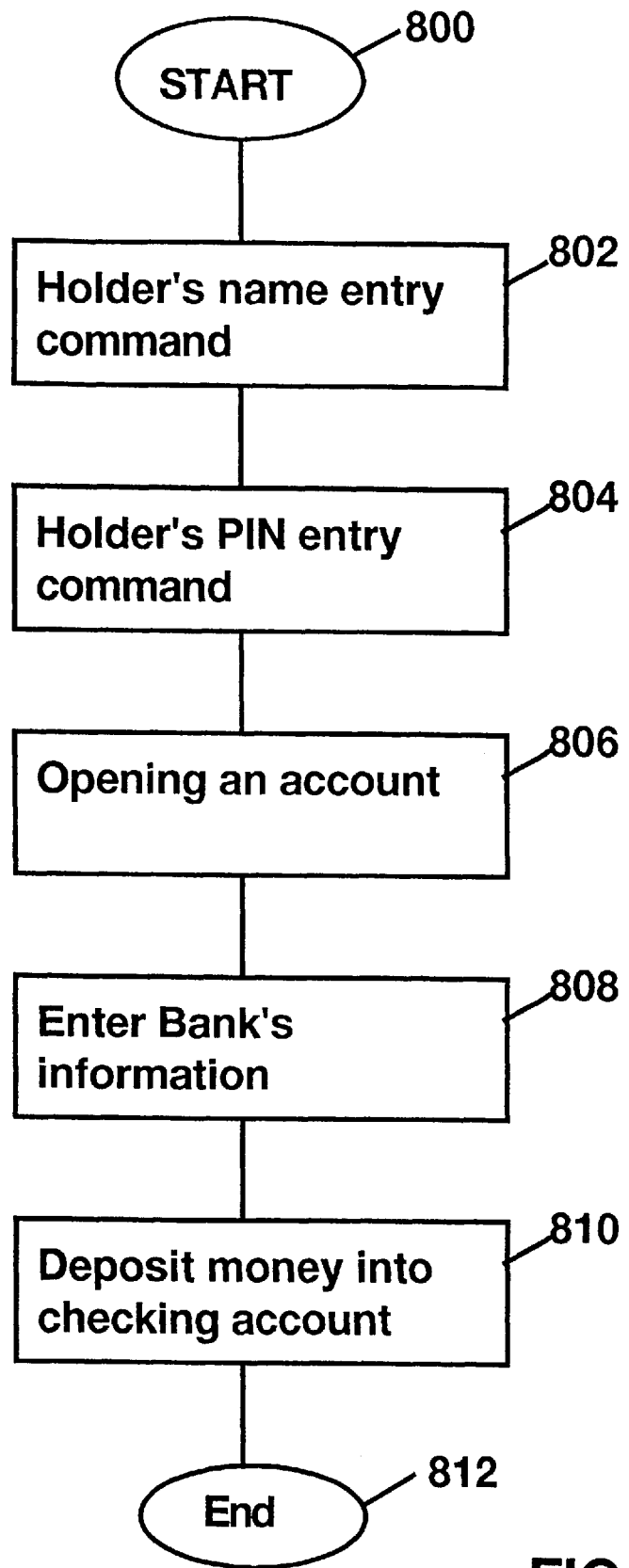
FIG. 10 is a flowchart illustrating, in one embodiment, the steps taken to open a checking account with a blank universal financial data card.

To facilitate understanding of the operation of the universal financial data system 204 disclosed herein, a series of flowcharts is discussed below. FIG. 10 is a flowchart illustrating the steps taken to obtain a blank UFDC 201 from a financial institution to, for example, open a checking account. It should be noted that the steps of FIG. 10 are merely illustrative and represent the steps taken for a blank universal financial card. Once the holder's data and bank data are entered, for example, steps to enter those data need not be repeated when adding additional accounts or processing a financial transaction.

In step 802, a holder's name entry command is issued to a blank UFDC 201 via a card reader 202 and stored (as command code 41h according to the example given in Table 1), along with the string of data representing the holder's name in UFDC 201. In step 804, a holder's pin entry command is issued to UFDC 201 and stored (as command code 44h) along with the string of data representing the holder's password. In step 806, an open account command is issued to UFDC 201 and stored (as command code 90h) along with the string of data representing the account information. Also in step 806, a bank password entry command is issued to UFDC 201 and stored (as command code 4Bh) along with the password associated with the account opened. In step 808, a bank information is stored, using the appropriate command codes and strings of data, in UFDC 201 for the account opened. In step 810, the newly opened account is selected, authenticated via a password verification procedure using the password entered in step 806, and if all goes well, a deposit command is issued. This deposit command is then stored (as command code 70h) along with the data string representing the amount deposited in UFDC 201.

Figure 11:
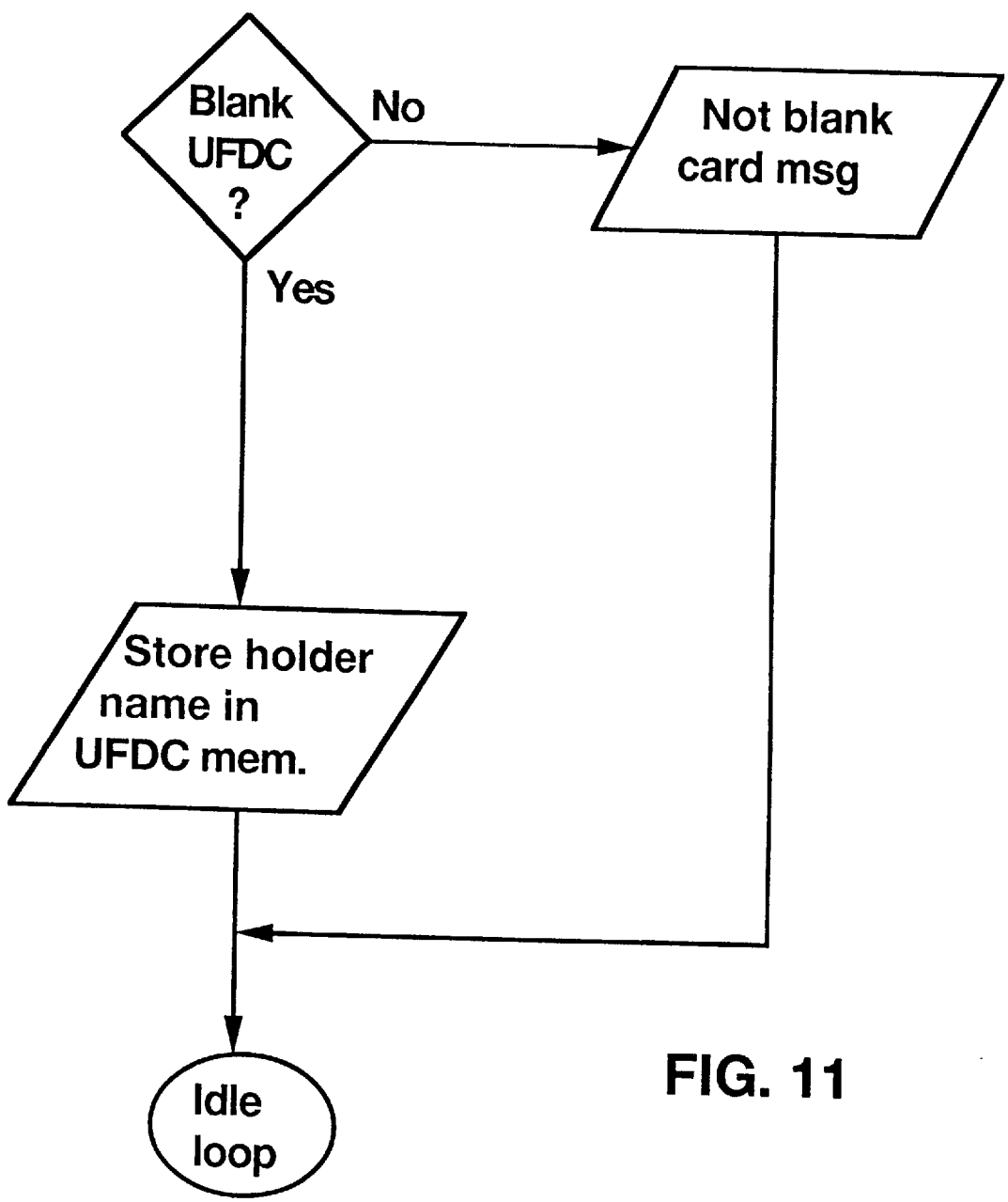
FIG. 11 illustrates, in one embodiment, the steps for entering the holder's name for storage in the universal financial data card.
Figure 12:
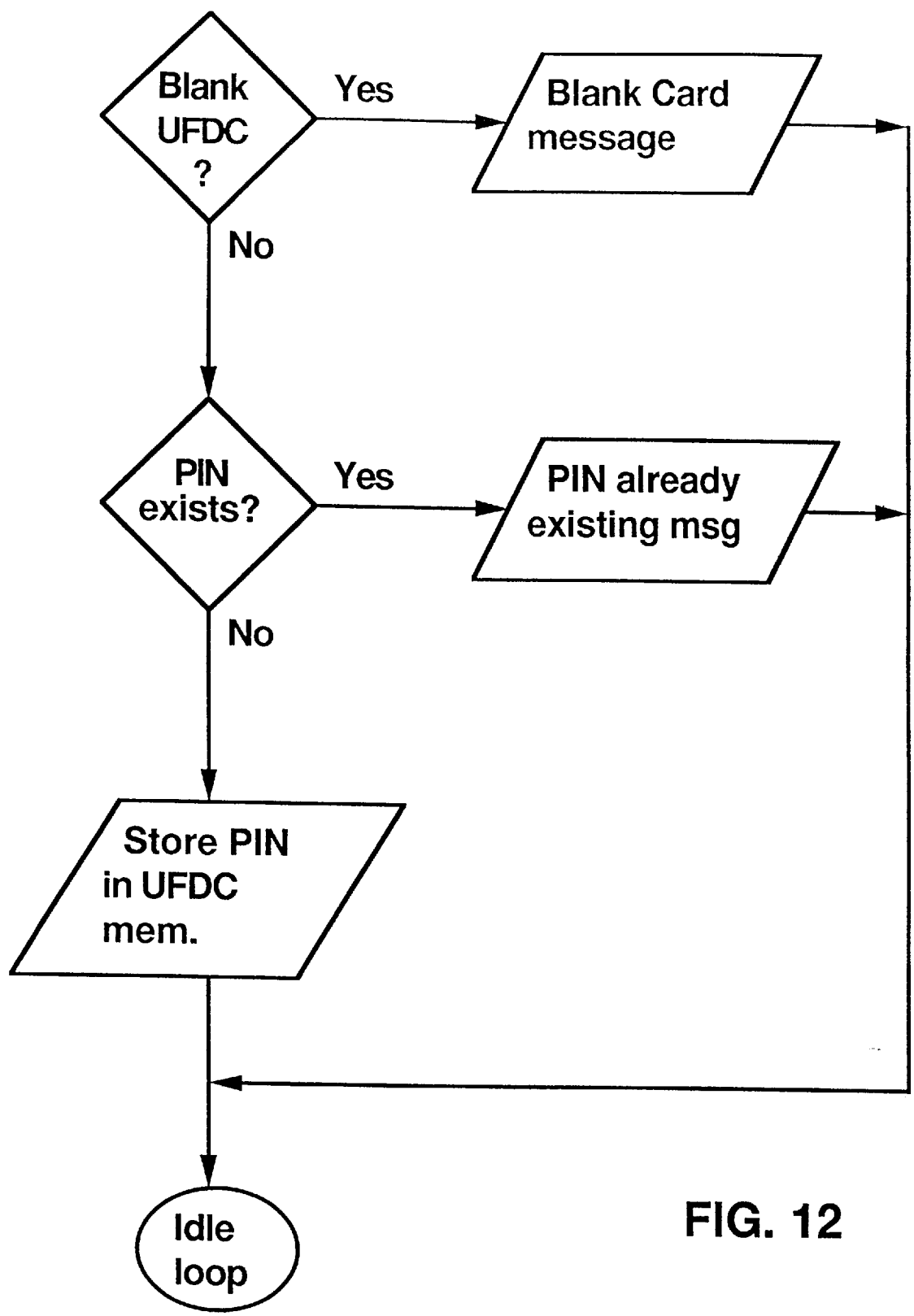
FIG. 12 illustrates, in one embodiment, the steps for entering the holder's personal identification number (PIN) for storage in the universal financial data card.
Figure 13:
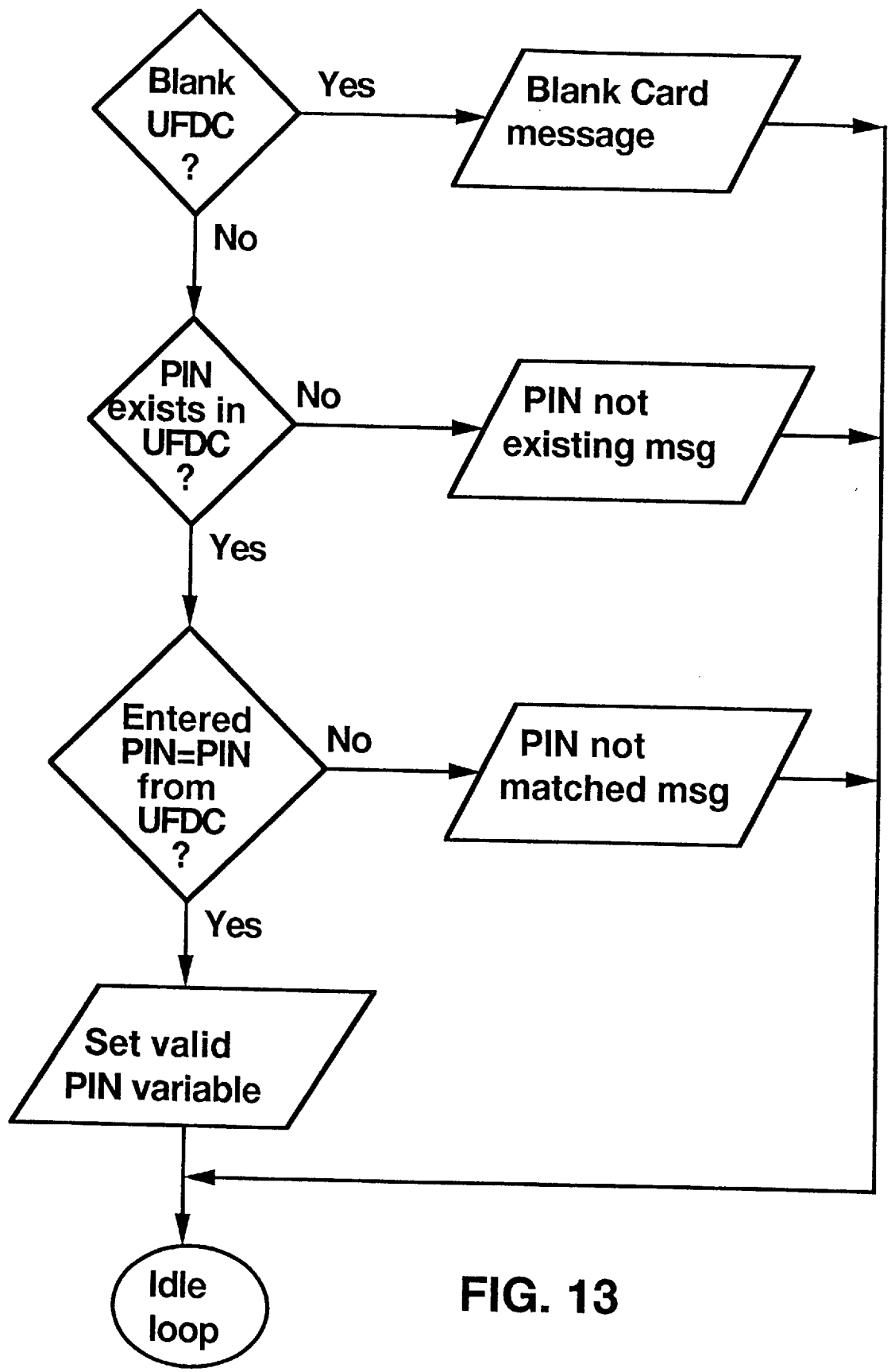
FIG. 13 illustrates, in one embodiment, the steps for authenticating a user of the universal financial data card via a holder PIN verification procedure.
Figure 14:
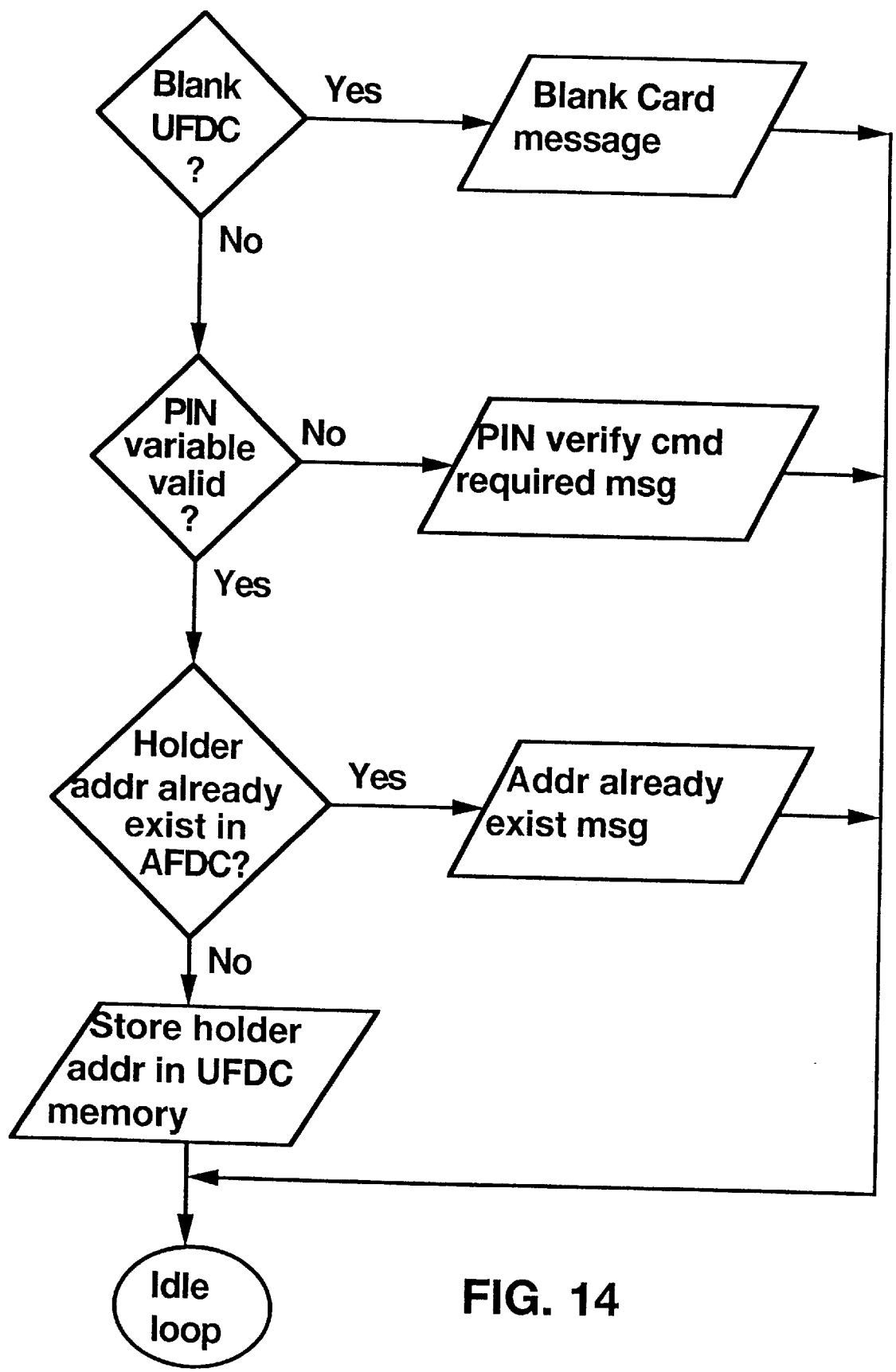
FIG. 14 illustrates, in one embodiment, the steps for entering the holder's address for storage in the universal financial data card once the holder's PIN number entered is determined to be valid.

FIGS. 11–21 illustrate the steps for illustration purposes, taken by the processor within UFDC 201 and in accordance with one embodiment, for performing selected operations with respect to UFDC 201. It should be kept in mind that the flowcharts illustrated in these figures are merely illustrative and are not meant to be an inclusive demonstration of the operations which UFDS 204 and UFDC 201 are capable of performing. FIG. 11 illustrates the steps for entering the holder's name for storage in UFDC 201. FIG. 12 illustrates the steps for entering the holder's personal identification number (PIN) for storage in UFDC 201. FIG. 13 illustrates the steps for authenticating a user of UFDC 201 via a holder pin verification procedure. FIG. 14 illustrates the steps for entering the holder's address for storage in UFDC 201 once the PIN number entered is determined to be valid. The steps for entering other data relating to the holder are substantially similar to those shown in FIG. 14.

Figure 15:
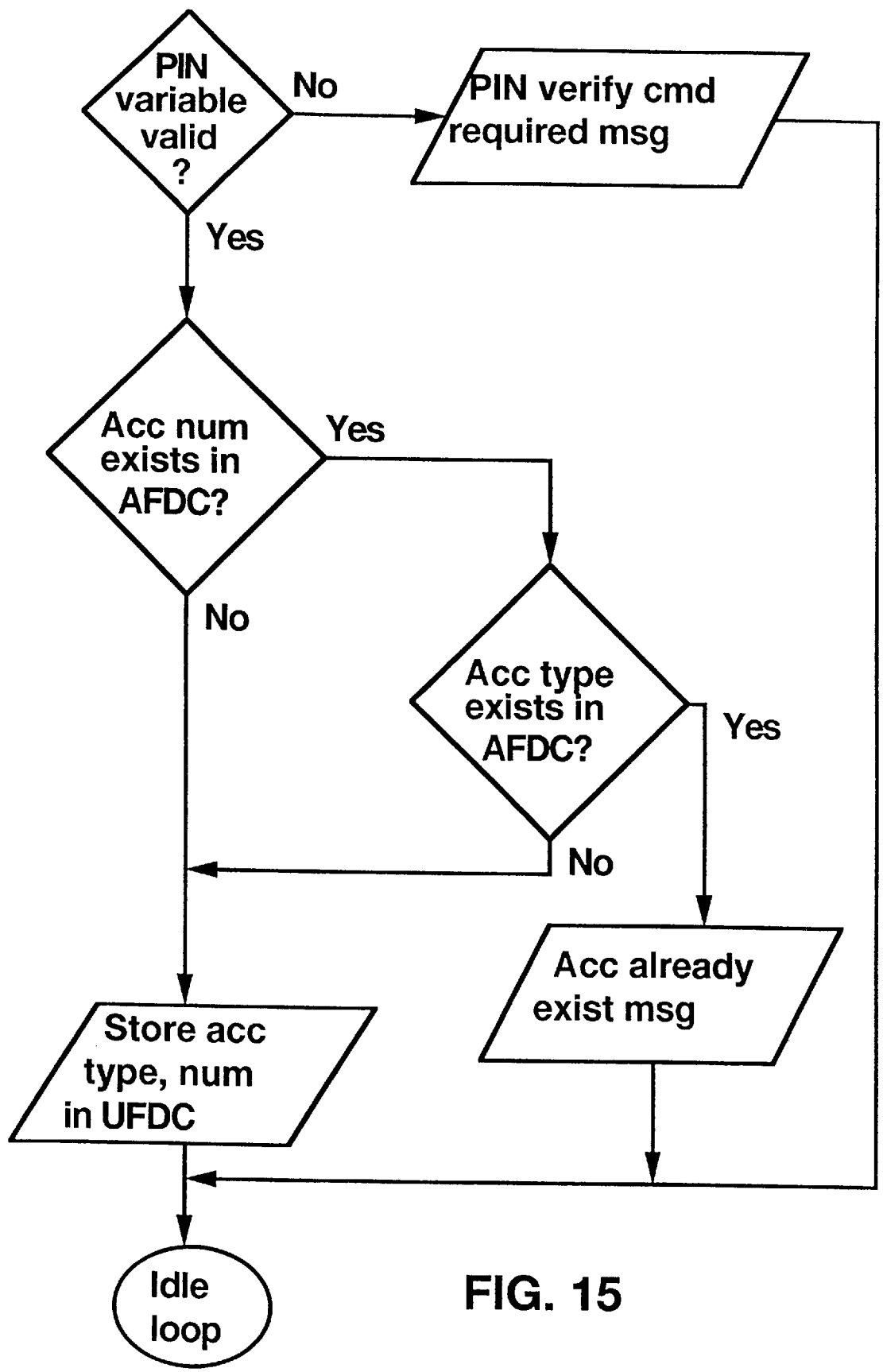
FIG. 15 illustrates, in one embodiment, the steps for opening a new financial account and storing the relevant data related to the new financial account in the universal financial data card once the PIN number entered is determined to be valid.
Figure 16:
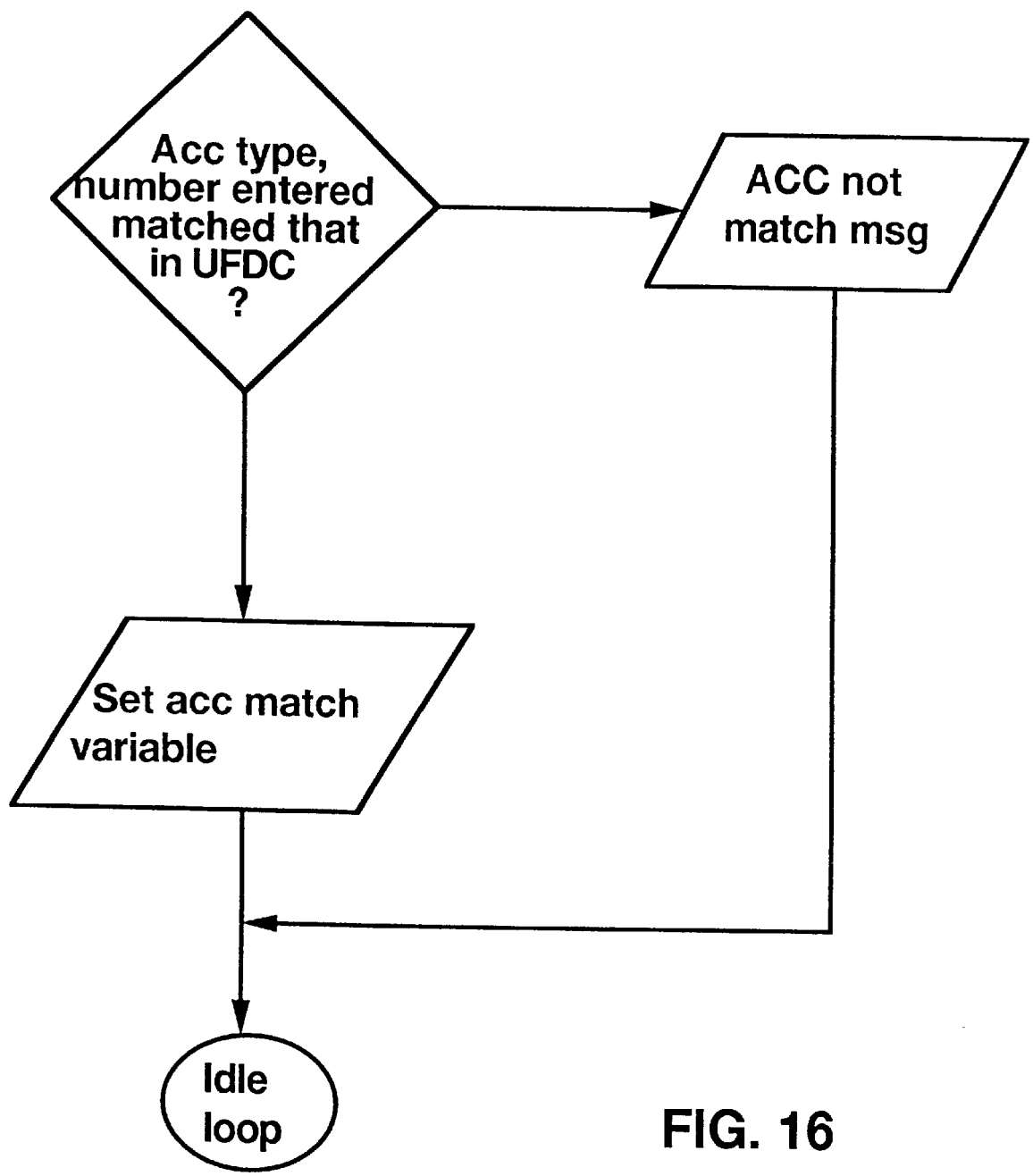
FIG. 16 illustrates, in one embodiment, the steps for selecting an account in the universal financial data card for subsequent operation and/or use.
Figure 17:
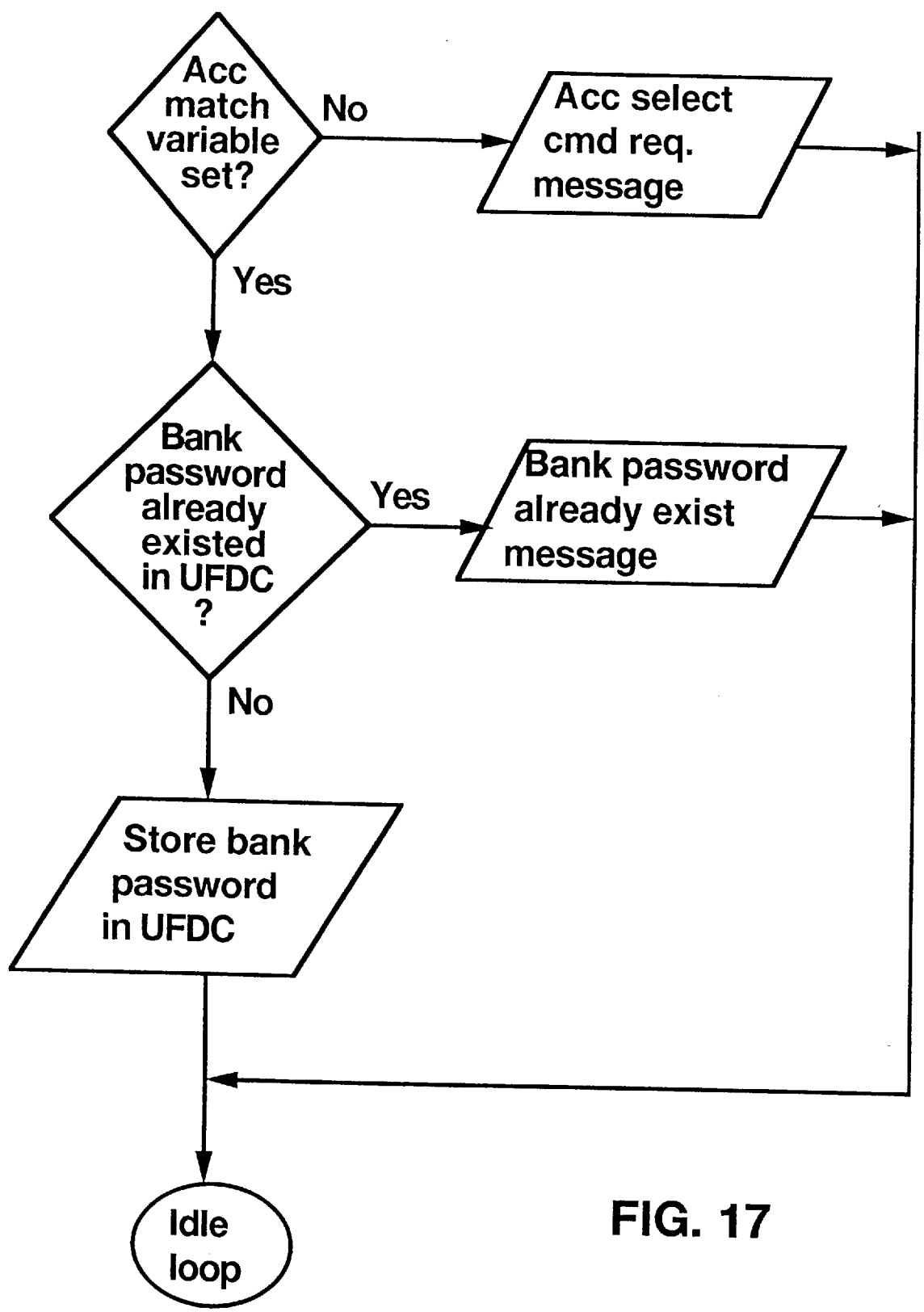
FIG. 17 illustrates, in one embodiment, the steps for entering a bank password and storing it in the universal financial data card.
Figure 18:
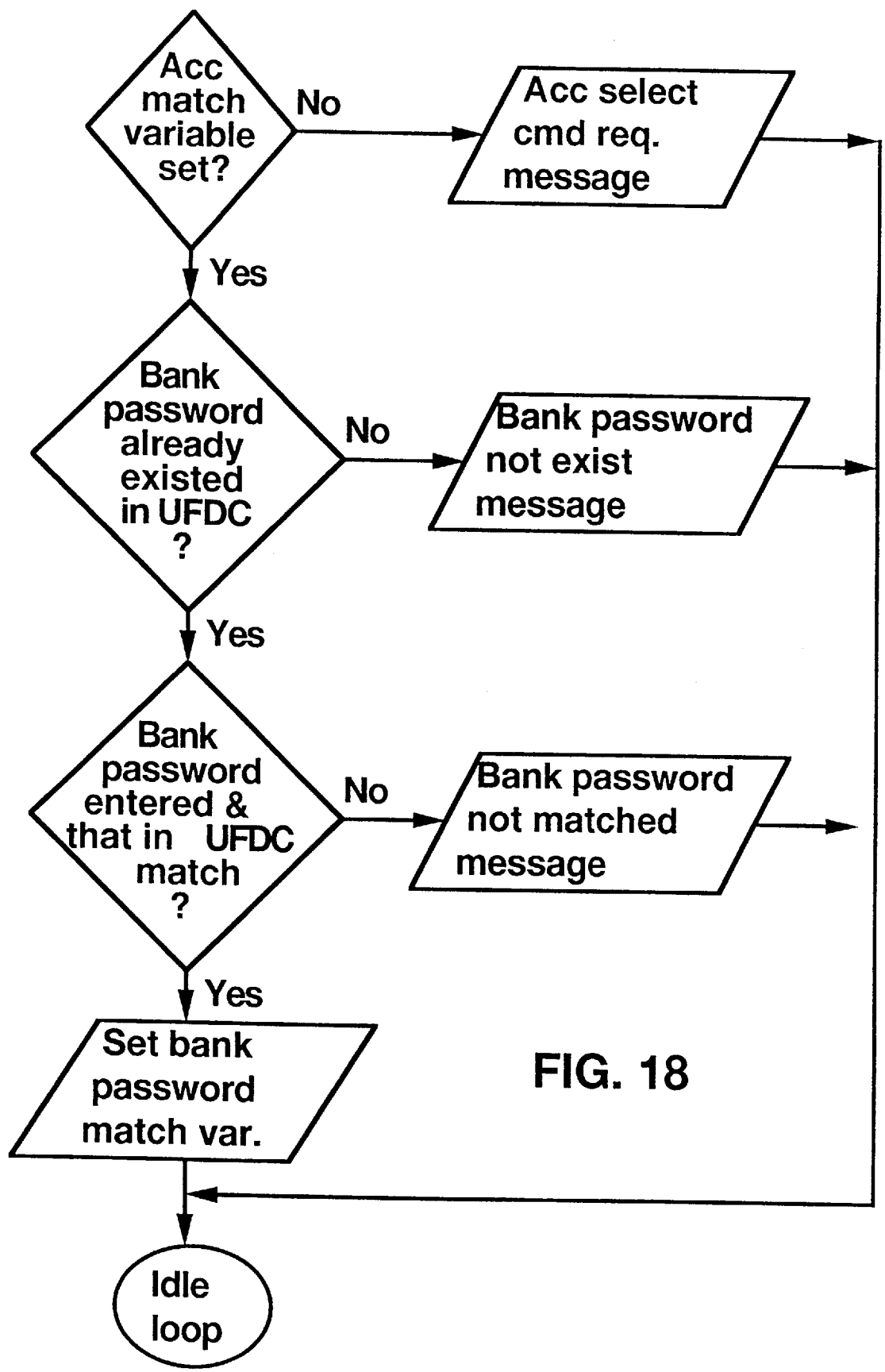
FIG. 18 illustrates, in one embodiment, the steps for verifying that access to a particular account is authorized via a bank password verification procedure.
Figure 19:
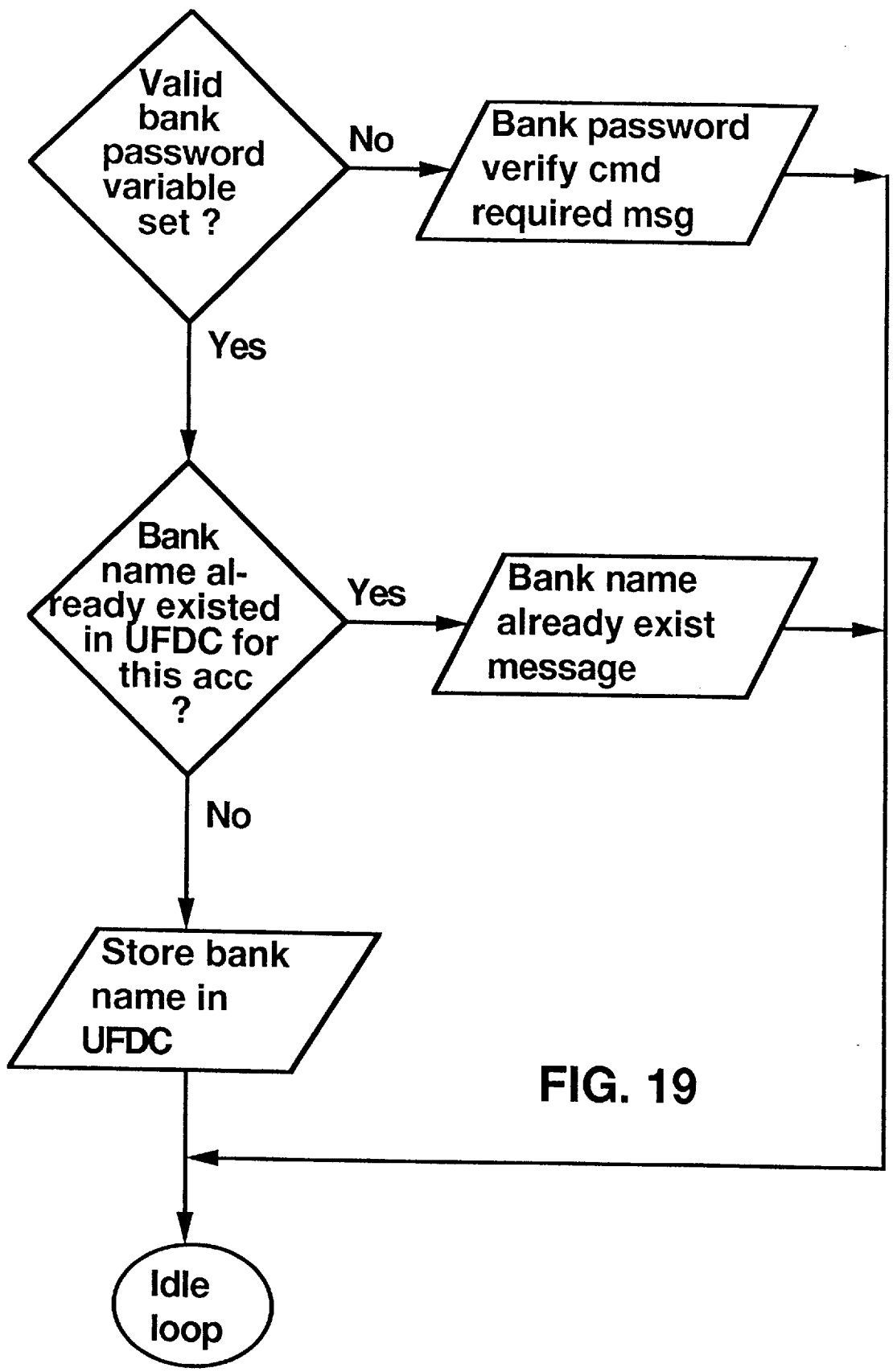
FIG. 19 illustrates, in one embodiment, the steps for entering the bank's name for storage in the universal financial data card.
Figure 20:
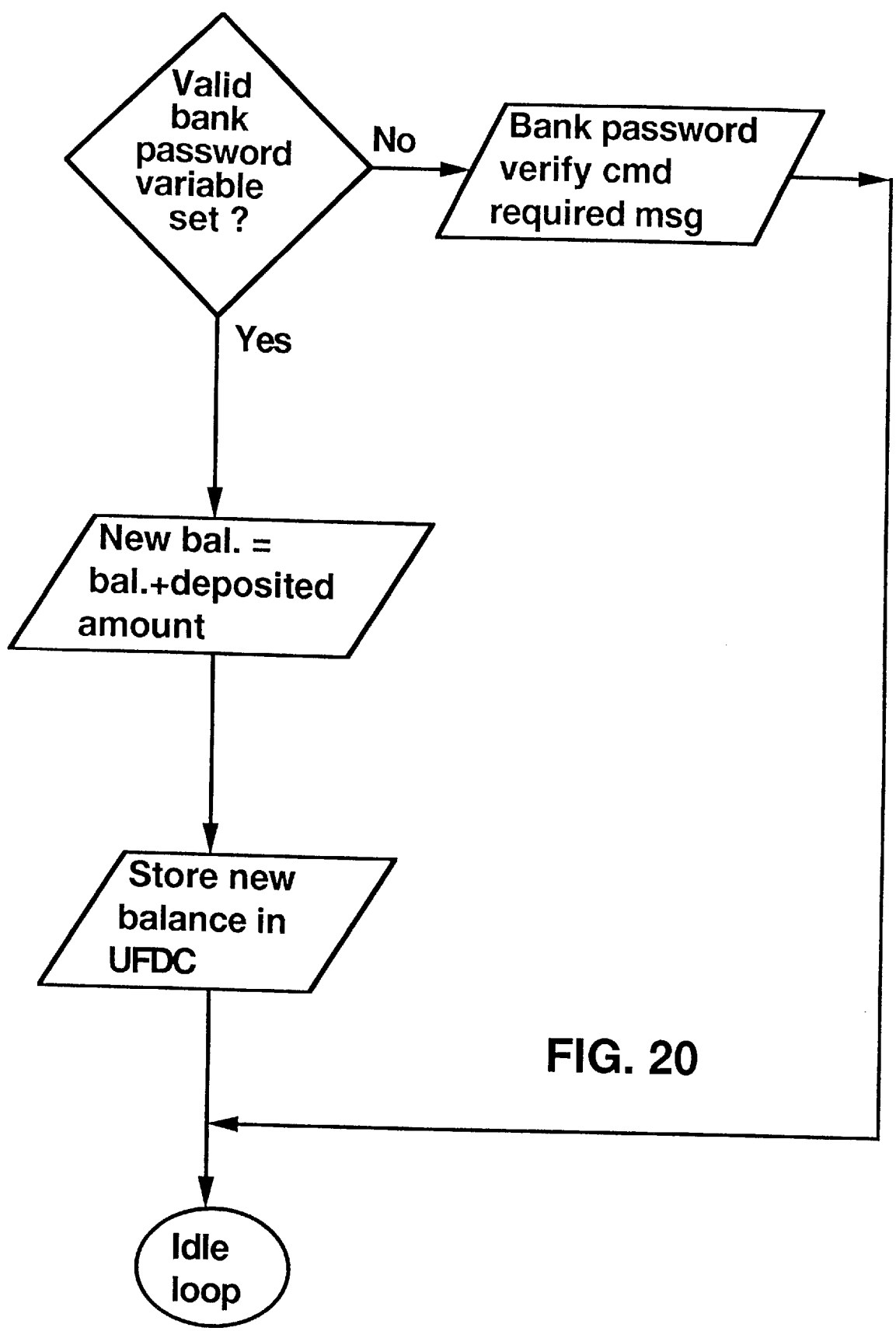
FIG. 20 illustrates, in one embodiment, the steps for depositing money into a selected financial account and storing the new balance in the universal financial data card.
Figure 21:
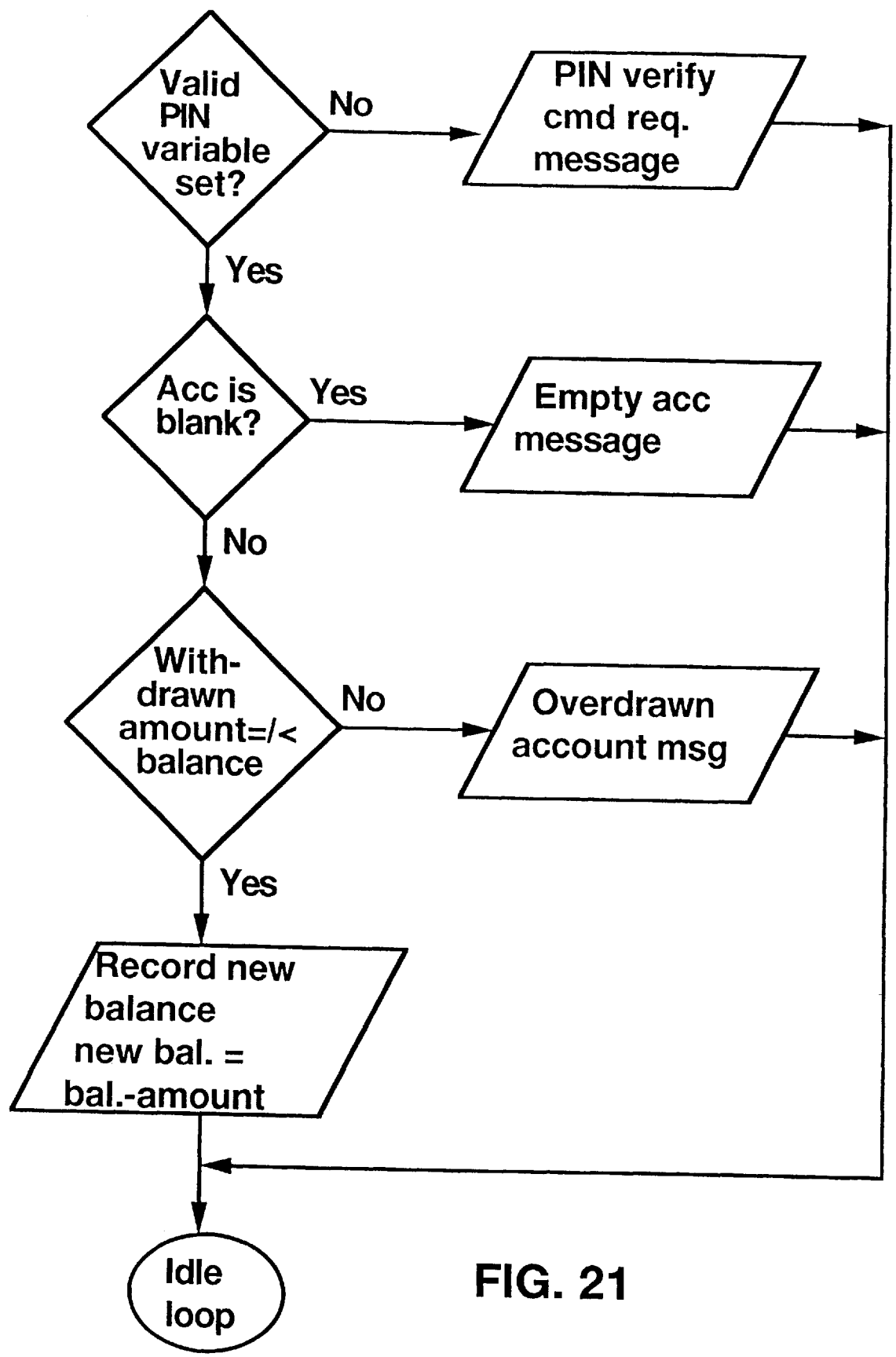
FIG. 21 illustrates, in one embodiment, the steps for withdrawing money from a selected financial account and storing the new balance in the universal financial data card.

FIG. 15 illustrates the steps for opening a new financial account and storing the relevant data related to the new financial account in UFDC 201 once the PIN number entered is determined to be valid. FIG. 16 illustrates the steps for selecting an account in UFDC 201 for subsequent operation and/or use. FIG. 17 illustrates the steps for entering a bank password and storing it in UFDC 201. FIG. 18 illustrates the steps for verifying that access to a particular account is authorized via a bank password verification procedure. FIG. 19 illustrates the steps for entering the bank's name for storage in UFDC 201. The steps for entering other data relating to the bank such as bank's address, bank's phone, and the like, are substantially similar to the steps shown in FIG. 19. FIG. 20 illustrates the steps for depositing a sum of money into a selected financial account and storing the new balance in UFDC 201. For a credit account, the steps for increasing the credit limit is substantially similar to those shown in FIG. 20. FIG. 21 illustrates the steps for withdrawing money from a selected financial account and storing the new balance in UFDC 201. The steps for writing a check are substantially similar to those shown in FIG. 21.

While this invention has been described in terms of several preferred embodiments, there are alterations, permutations, and equivalents which fall within the scope of this invention. It should also be noted that there are may alternative ways of implementing the processes of the present invention. Further, although the invention is described using flowcharts as an illustration aid, it should be noted that the methods and apparatus of the present invention may be event driven, capable of executing multiple processes at the same time. As such, different processes and tasks do not necessarily have to be performed in the specific sequential order chosen for illustration, and a processor implementing the inventive technique may be executing other tasks while executing the steps disclosed herein. It is therefore intended that the following appended claims be interpreted as including all such alterations, permutations, and equivalents as fall within the true spirit and scope of the present invention.

What is claimed is:

1. A multiple account electronic credit card comprising:
   a processor for controlling operation of the card;
   a memory circuit for storing financial transaction records of multiple accounts;
   a wireless or non-wireless interface for communication with a card reader;
   a frequency select circuit for communicating with said card reader using any one of a number of preselected frequencies;
   said memory circuit also storing holder information and secondary account information;
   wherein said holder information comprises name, address, telephone number and personal identification number and wherein said secondary account information comprises institution name, account number, and account password;

wherein said memory is of sufficient size to store financial transaction records related to a predetermined time period of use of use and wherein the data in the memory circuit may be transferred to a new multiple account electronic credit card at the end of said predetermined time period.

2. The multiple account electronic credit card of claim 1 wherein said predetermined time period is one calendar year or greater.

3. A credit card system comprising:

a multiple account electronic credit card;

said card comprising:

a processor for controlling operation of the card;

a memory circuit for storing financial transaction records of a plurality of financial accounts;

a wireless or non-wireless interface for communication with a card reader;

a frequency select circuit for communicating with said card reader using any one of a number of preselected frequencies;

said memory circuit also storing holder information and secondary account information;

wherein said holder information comprises name, address, telephone number and personal identification number and wherein said secondary account information comprises institution name, account number, and account password;

wherein said memory is of sufficient size to store financial transaction records related to a predetermined time period of use and wherein the data in the memory circuit may be transferred to a new multiple account electronic credit card at the end of said predetermined time period;

storage means for storing financial transaction records of a plurality of financial accounts remote from said card;

transfer means for transferring said financial transaction records from said storage means to a new blank multiple account electronic card at a specified time;

wherein said specified time comprises the time of the loss or destruction of said multiple account electronic card.

4. The credit card system of claim 3 further comprising means for retrieving said financial transaction records through a telephone set, wherein said financial transaction records are transmitted in the form of voice data, printer data, or video data.

5. The credit card system of claim 3 further comprising means for managing and storing said financial transaction records using a serial decoding scheme.

6. The credit card system of claim 3 further comprising means for managing and storing said financial transaction records using a parallel decoding scheme.

7. The credit card system of claim 3 wherein said predetermined time period is one calendar year or greater.

* * * * *